US011136751B2

(12) United States Patent
Frackelton

(10) Patent No.: US 11,136,751 B2
(45) Date of Patent: Oct. 5, 2021

(54) ELECTRONIC PLUMBING FIXTURE FITTING INCLUDING PRESET FEATURE

(71) Applicant: Moen Incorporated, North Olmsted, OH (US)

(72) Inventor: Brian Patrick Frackelton, Macedonia, OH (US)

(73) Assignee: FB Global Plumbing Group LLC, North Olmsted, OH (US)

( * ) Notice: Subject to any disclaimer, the term of this patent is extended or adjusted under 35 U.S.C. 154(b) by 145 days.

(21) Appl. No.: 16/656,553

(22) Filed: Oct. 17, 2019

(65) Prior Publication Data

US 2020/0123747 A1    Apr. 23, 2020

Related U.S. Application Data

(60) Provisional application No. 62/880,999, filed on Jul. 31, 2019, provisional application No. 62/746,871, filed on Oct. 17, 2018, provisional application No. 62/746,869, filed on Oct. 17, 2018.

(51) Int. Cl.
| | |
|---|---|
| *F16K 31/02* | (2006.01) |
| *E03C 1/05* | (2006.01) |
| *G09B 23/12* | (2006.01) |
| *E03C 1/04* | (2006.01) |
| *G05D 23/13* | (2006.01) |
| *E03C 1/02* | (2006.01) |

(52) U.S. Cl.
CPC ............ *E03C 1/057* (2013.01); *E03C 1/0404* (2013.01); *E03C 1/0412* (2013.01); *G05D 23/1353* (2013.01); *G05D 23/1393* (2013.01); *G09B 23/12* (2013.01); *E03C 2001/026* (2013.01); *E03C 2001/0418* (2013.01)

(58) Field of Classification Search
CPC ................................ E03C 1/055; E03C 1/057
See application file for complete search history.

(56) References Cited

U.S. PATENT DOCUMENTS

| | | | |
|---|---|---|---|
| 3,685,728 | A | 8/1972 | Chapou |
| 3,726,318 | A | 4/1973 | Hyde |
| 4,359,186 | A | 11/1982 | Kiendl |
| 4,420,811 | A | 12/1983 | Tarnay et al. |
| 4,640,284 | A | 2/1987 | Ruderian |
| 4,653,538 | A | 3/1987 | Tsutsui et al. |
| 4,762,273 | A | 8/1988 | Gregory et al. |
| 4,842,191 | A | 6/1989 | Bergmann |
| 4,978,833 | A | 12/1990 | Knepler |

(Continued)

FOREIGN PATENT DOCUMENTS

| | | |
|---|---|---|
| AU | 2004254286 A1 | 1/2005 |
| CA | 2933836 A1 | 11/2007 |

(Continued)

OTHER PUBLICATIONS

International Search Report for International App. No. PCT/US2019/056834 dated Jan. 10, 2020 (2 pages).

(Continued)

*Primary Examiner* — Reinaldo Sanchez-Medina
(74) *Attorney, Agent, or Firm* — Calfee, Halter & Griswold LLP

(57) ABSTRACT

The present invention provides an electronic plumbing fixture fitting including a preset feature.

21 Claims, 35 Drawing Sheets

(56) References Cited

U.S. PATENT DOCUMENTS

| | | |
|---|---|---|
| 5,174,495 A | 12/1992 | Eichholz et al. |
| 5,184,642 A | 2/1993 | Powell |
| 5,462,224 A | 10/1995 | Enoki et al. |
| 5,511,723 A | 4/1996 | Toshio et al. |
| 5,843,145 A | 12/1998 | Brink |
| 6,305,036 B1 | 10/2001 | Bergmann |
| 6,328,067 B1 | 12/2001 | Hsiung |
| 6,549,816 B2 | 4/2003 | Gauthier et al. |
| 6,729,344 B1 | 5/2004 | Hung |
| 6,817,201 B2 | 11/2004 | Yingst |
| 6,879,863 B2 | 4/2005 | Mueller et al. |
| 6,935,368 B1 | 8/2005 | Lee |
| 7,235,762 B2 | 6/2007 | Gagas et al. |
| 7,458,520 B2 | 12/2008 | Belz et al. |
| 7,889,187 B2 | 2/2011 | Freier et al. |
| 8,534,318 B2 | 9/2013 | Kanemaru et al. |
| 8,847,913 B2 | 9/2014 | Tempas et al. |
| 9,057,183 B2 | 6/2015 | Chen |
| 9,085,882 B2 | 7/2015 | Hanna et al. |
| 9,128,495 B2 | 9/2015 | Freier et al. |
| 9,244,466 B2 | 1/2016 | DuPlessis et al. |
| 9,285,807 B2 | 3/2016 | Rodenbeck et al. |
| 9,632,514 B2 | 4/2017 | Marty et al. |
| 9,777,470 B2 | 10/2017 | Mazz et al. |
| 9,783,964 B2 | 10/2017 | Thompson et al. |
| 9,878,921 B2 | 1/2018 | Hunter et al. |
| 9,910,578 B2 | 3/2018 | Freier et al. |
| 9,945,103 B2 | 4/2018 | Thompson et al. |
| 10,138,620 B2 | 11/2018 | Block et al. |
| 10,184,232 B2 | 1/2019 | Veros et al. |
| 2004/0256009 A1 | 12/2004 | Valenzuela |
| 2006/0138246 A1 | 6/2006 | Stowe et al. |
| 2006/0186215 A1 | 8/2006 | Logan |
| 2006/0272596 A1 | 12/2006 | DeSantis |
| 2007/0152074 A1 | 7/2007 | Stowe et al. |
| 2007/0246550 A1* | 10/2007 | Rodenbeck ........ G05D 23/1353 236/12.11 |
| 2008/0083893 A1 | 4/2008 | Rubenstein |
| 2008/0156889 A1 | 7/2008 | Shapira et al. |
| 2008/0271238 A1 | 11/2008 | Reeder et al. |
| 2009/0056011 A1 | 3/2009 | Wolf et al. |
| 2011/0005619 A1 | 1/2011 | Kanemaru et al. |
| 2011/0253241 A1 | 10/2011 | Cheng et al. |
| 2012/0138177 A1 | 6/2012 | Wang |
| 2013/0291978 A1 | 11/2013 | Baker et al. |
| 2014/0102569 A1 | 4/2014 | Cartier |
| 2014/0261781 A1 | 9/2014 | Dolgos |
| 2015/0218784 A1 | 8/2015 | Mazz et al. |
| 2016/0076231 A1 | 3/2016 | Goel et al. |
| 2016/0195882 A1 | 7/2016 | Rodenbeck et al. |
| 2016/0208465 A1 | 7/2016 | Evans et al. |
| 2016/0273197 A1 | 9/2016 | Gregory et al. |
| 2016/0333556 A1 | 11/2016 | Veros et al. |
| 2017/0059050 A1 | 3/2017 | Chiu et al. |
| 2017/0084189 A1 | 3/2017 | Rubalcaba et al. |
| 2017/0268208 A1 | 9/2017 | LaMarche |
| 2017/0315569 A1 | 11/2017 | Rodenbeck et al. |
| 2017/0328040 A1 | 11/2017 | Tzeng |
| 2017/0328042 A1 | 11/2017 | Tzeng |
| 2018/0216324 A1 | 8/2018 | Beck et al. |
| 2018/0216325 A1 | 8/2018 | Chen |
| 2018/0291600 A1 | 10/2018 | Beck et al. |
| 2018/0340623 A1 | 11/2018 | Chiu et al. |
| 2018/0355593 A1 | 12/2018 | Tracy |

FOREIGN PATENT DOCUMENTS

| | | |
|---|---|---|
| CA | 2751904 A1 | 3/2012 |
| CA | 2724302 A1 | 6/2012 |
| CA | 2968559 A1 | 11/2017 |
| CA | 2981666 A1 | 4/2018 |
| CN | 2515491 Y | 10/2002 |
| CN | 201177099 Y | 1/2009 |
| CN | 201496650 U | 6/2010 |
| CN | 201884755 U | 6/2011 |
| CN | 102352937 A | 2/2012 |
| CN | 202176804 U | 3/2012 |
| CN | 202392273 U | 8/2012 |
| CN | 20248422 U | 10/2012 |
| CN | 102818067 A | 12/2012 |
| CN | 203082349 U | 7/2013 |
| CN | 103821986 A | 5/2014 |
| CN | 204437404 U | 7/2015 |
| CN | 105351622 A | 2/2016 |
| CN | 105795912 A | 7/2016 |
| CN | 207740493 U | 8/2018 |
| EP | 0123227 A2 | 10/1984 |
| EP | 0886013 A1 | 12/1998 |
| GB | 1119659 A | 7/1968 |
| GB | 2498919 A | 8/2013 |
| IN | 3707DELNP2014 A | 2/2015 |
| JP | 1991024383 A | 2/1991 |
| JP | 2000305587 A | 11/2000 |
| JP | 2013194873 A | 9/2013 |
| NL | 170770 C | 11/1982 |
| SG | 123000 A1 | 7/2006 |
| TW | 201416589 A | 5/2014 |
| TW | 201837277 A | 10/2018 |
| WO | 2005003470 A1 | 1/2005 |
| WO | 2016040591 A1 | 3/2016 |
| WO | 20180231977 A1 | 12/2018 |

OTHER PUBLICATIONS

Written Opinion of the International Searching Authority for International App. No. PCT/US2019/056834 dated Jan. 10, 2020 (12 pages).

* cited by examiner

Do you want to control
the water temperature?

Run faucet to
demonstrate desired
temperature. Then,
turn off water.

*Waiting for faucet
interaction to
complete......*

That was 97°F. If the faucet is not already at that temperature, do you want to purge the line to get that temperature?

How much water?

Specify Exact Volume

Dispense volume of interest and stop.

*Waiting for faucet interaction to complete.....*

Figure 30

ELECTRONIC PLUMBING FIXTURE FITTING INCLUDING PRESET FEATURE

CROSS-REFERENCE TO RELATED APPLICATIONS

This application claims the benefit of U.S. Provisional Application No. 62/746,869, filed Oct. 17, 2018, U.S. Provisional Application No. 62/746,871, filed Oct. 17, 2018, and U.S. Provisional Application No. 62/880,999, filed Jul. 31, 2019, the entire disclosures of which are hereby incorporated by reference.

FIELD

The present invention relates generally to an electronic plumbing fixture fitting and, more particularly, to an electronic plumbing fixture fitting, such as an electronic faucet or an electronic shower, including a preset feature.

BACKGROUND

Electronic plumbing fixture fittings, such as electronic faucets and electronic showers, are well known. Such electronic plumbing fixture fittings are used in residential and commercial applications, such as in kitchens, bathrooms, and various other locations. Users desire to use electronic plumbing fixture fittings. Many difficulties can be encountered in using electronic plumbing fixture fittings.

SUMMARY

The present invention provides an electronic plumbing fixture fitting including a preset feature.

In an exemplary embodiment, the electronic plumbing fixture fitting comprises a discharge outlet, an electronic valve, a user input module, a water sensor, and a processor. The user input module includes an electronic input device, a manual input device, and a position sensor. The discharge outlet is operable to deliver water. The electronic valve is operable to permit flow of water through the discharge outlet when the electronic valve is activated and to not permit flow of water through the discharge outlet when the electronic valve is deactivated. The electronic valve is operable to control a parameter of water flowing through the discharge outlet. The user input module is operable to communicate with a user regarding a desired value of the parameter of water. The electronic input device is operable to receive an instruction from the user regarding the desired value of the parameter of water. The manual input device is operable to be moved by the user to demonstrate a changed value of the parameter of water. The manual input device is operable to be moved by the user to demonstrate a changed value of the parameter of water. The position sensor is operable to detect movement of the manual input device to a position demonstrating the changed value of the parameter of water and to a predetermined final position. The water sensor is operable to detect a value of the parameter of water. The processor is operable to communicate with each of the electronic valve, the user input module, and the water sensor regarding at least one of the desired value of the parameter of water and the detected value of the parameter of water. The electronic input device is operable to receive an instruction from the user to create a preset for the desired value of the parameter of water and to instruct the user to demonstrate the desired value using the manual input device. The position sensor is operable to detect movement of the manual input device by the user to the position demonstrating the desired value of the parameter of water and to the predetermined final position and to send signals to the processor indicating the position demonstrating the desired value of the parameter of water and the predetermined final position. The processor is operable to receive the signals from the position sensor indicating the position demonstrating the desired value of the parameter of water and the predetermined final position and to send a signal to the electronic valve to control the parameter of water. The electronic valve is operable to receive the signal from the processor to control the parameter of water and to adjust the parameter of water. The water sensor is operable to detect the value of the parameter of water and to send a signal to the processor indicating the detected value of the parameter. Until the manual input device is moved to the predetermined final position, the processor is operable to receive the signal from the position sensor indicating the position demonstrating the desired value of the parameter of water and to send a signal to the electronic valve to further control the parameter of water. Until the manual input device is moved to the predetermined final position, the electronic valve is operable to receive the signal from the processor to control the electronic valve and to adjust the parameter of water. Until the manual input device is moved to the predetermined final position, the water sensor is operable to detect the value of the parameter of water and to send the signal to the processor indicating the detected value of the parameter. Once the manual input device is moved to the predetermined final position, the detected value of the parameter is saved as the preset.

In an exemplary embodiment, the electronic plumbing fixture fitting comprises a discharge outlet, an electronic valve, a user input module, a water sensor, and a processor. The user input module includes an electronic input device, a manual input device, and a position sensor. The discharge outlet is operable to deliver water. The electronic valve is operable to permit flow of water through the discharge outlet when the electronic valve is activated and to not permit flow of water through the discharge outlet when the electronic valve is deactivated. The electronic valve is operable to control a parameter of water flowing through the discharge outlet. The user input module is operable to communicate with a user regarding a desired value of the parameter of water. The electronic input device is operable to receive an instruction from the user regarding the desired value of the parameter of water. The manual input device is operable to be moved by the user to demonstrate a changed value of the parameter of water. The manual input device is operable to be moved by the user to demonstrate a changed value of the parameter of water. The position sensor is operable to detect movement of the manual input device to a position demonstrating the changed value of the parameter of water and to a predetermined final position. The water sensor is operable to detect a value of the parameter of water. The processor is operable to communicate with each of the electronic valve, the user input module, and the water sensor regarding at least one of the desired value of the parameter of water and the detected value of the parameter of water. The electronic input device is operable to receive an instruction from the user to create a preset for the desired value of the parameter of water and to instruct the user to demonstrate the desired value using the manual input device. The position sensor is operable to detect movement of the manual input device by the user to the position demonstrating the desired value of the parameter of water and to the predetermined final position and to send signals to the processor indicating the position demonstrating the desired value of the parameter of water and the predetermined final position. The processor is operable to receive the signals from the position sensor indicating the position demonstrating the desired value of the parameter of water and the predetermined final position and to send a signal to the electronic valve to control the parameter of water. The electronic valve is operable to receive the signal from the processor to control the parameter of water and to adjust the parameter of water. The water sensor is operable to detect the value of the parameter of water and to send a signal to the processor indicating the detected value of the parameter. Until the manual input device is moved to the predetermined final position, the processor is operable to receive the signal from the position sensor indicating the position demonstrating the desired value of the parameter of water and to send a signal to the electronic valve to further control the parameter of water. Until the manual input device is moved to the predetermined final position, the electronic valve is operable to receive the signal from the processor to control the electronic valve and to adjust the parameter of water. Until the manual input device is moved to the predetermined final position, the water sensor is operable to detect the value of the parameter of water and to send the signal to the processor indicating the detected value of the parameter. Once the manual input device is moved to the predetermined final position, if the manual input device is in a full hot position, the electronic input device communicates with the user asking if the user wants the detected value of the parameter or the hottest temperature water that is available when the user selects the preset, if the user wants the detected value of the parameter, the detected value of the parameter is saved as the preset, and if the user wants the hottest temperature water that is available, that information is saved as the preset. Once the manual input device is moved to the predetermined final position, if the manual input device is in a full cold position, the electronic input device communicates with the user asking if the user wants the detected value of the parameter or the coldest temperature water that is available when the user selects the preset, if the user wants the detected value of the parameter, the detected value of the parameter is saved as the preset, and if the user wants the coldest temperature water that is available, that information is saved as the preset.

In an exemplary embodiment, the electronic plumbing fixture fitting comprises a discharge outlet, an electronic valve, a user input module, a water sensor, and a processor. The user input module includes an electronic input device, a manual input device, and a position sensor. The discharge outlet is operable to deliver water. The electronic valve is operable to permit flow of water through the discharge outlet when the electronic valve is activated and to not permit flow of water through the discharge outlet when the electronic valve is deactivated. The electronic valve is operable to control a parameter of water flowing through the discharge outlet. The user input module is operable to communicate with a user regarding a desired value of the parameter of water. The electronic input device is operable to receive an instruction from the user regarding the desired value of the parameter of water. The manual input device is operable to be moved by the user to demonstrate a changed value of the parameter of water. The manual input device is operable to be moved by the user to demonstrate a changed value of the parameter of water. The position sensor is operable to detect movement of the manual input device to a position demonstrating the changed value of the parameter of water and to a predetermined final position. The water sensor is operable to detect a value of the parameter of water. The processor is operable to communicate with each of the electronic valve, the user input module, and the water sensor regarding at least one of the desired value of the parameter of water and the detected value of the parameter of water. The electronic input device is operable to receive an instruction from the user to create a preset for the desired value of the parameter of water and to instruct the user to demonstrate the desired value using the manual input device. The position sensor is operable to detect movement of the manual input device by the user to the position demonstrating the desired value of the parameter of water and to the predetermined final position and to send signals to the processor indicating the position demonstrating the desired value of the parameter of water and the predetermined final position. The processor is operable to receive the signals from the position sensor indicating the position demonstrating the desired value of the parameter of water and the predetermined final position and to send a signal to the electronic valve to control the parameter of water. The electronic valve is operable to receive the signal from the processor to control the parameter of water and to adjust the parameter of water. The water sensor is operable to detect the value of the parameter of water and to send a signal to the processor indicating the detected value of the parameter. Until the manual input device is moved to the predetermined final position, the processor is operable to receive the signal from the position sensor indicating the position demonstrating the desired value of the parameter of water and to send a signal to the electronic valve to further control the parameter of water. Until the manual input device is moved to the predetermined final position, the electronic valve is operable to receive the signal from the processor to control the electronic valve and to adjust the parameter of water. Until the manual input device is moved to the predetermined final position, the water sensor is operable to detect the value of the parameter of water and to send the signal to the processor indicating the detected value of the parameter. Once the manual input device is moved to the predetermined final position, information regarding the detected value of the parameter is saved as a session. After the manual input device is moved to the predetermined final position, the electronic input device communicates with the user asking if they want to save the session as a preset. If the user wants to save the session as a preset, the session information is saved as the preset.

BRIEF DESCRIPTION OF THE DRAWINGS

FIG. 30 is an illustration of session data or information for an electronic plumbing fixture fitting according to an exemplary embodiment of the present invention;

DETAILED DESCRIPTION

The present invention provides an electronic plumbing fixture fitting. In an exemplary embodiment, the electronic plumbing fixture fitting is an electronic faucet. However, one of ordinary skill in the art will appreciate that the electronic plumbing fixture fitting could be an electronic showering system, an electronic showerhead, an electronic handheld shower, an electronic body spray, an electronic side spray, or any other electronic plumbing fixture fitting.

Figure 1:
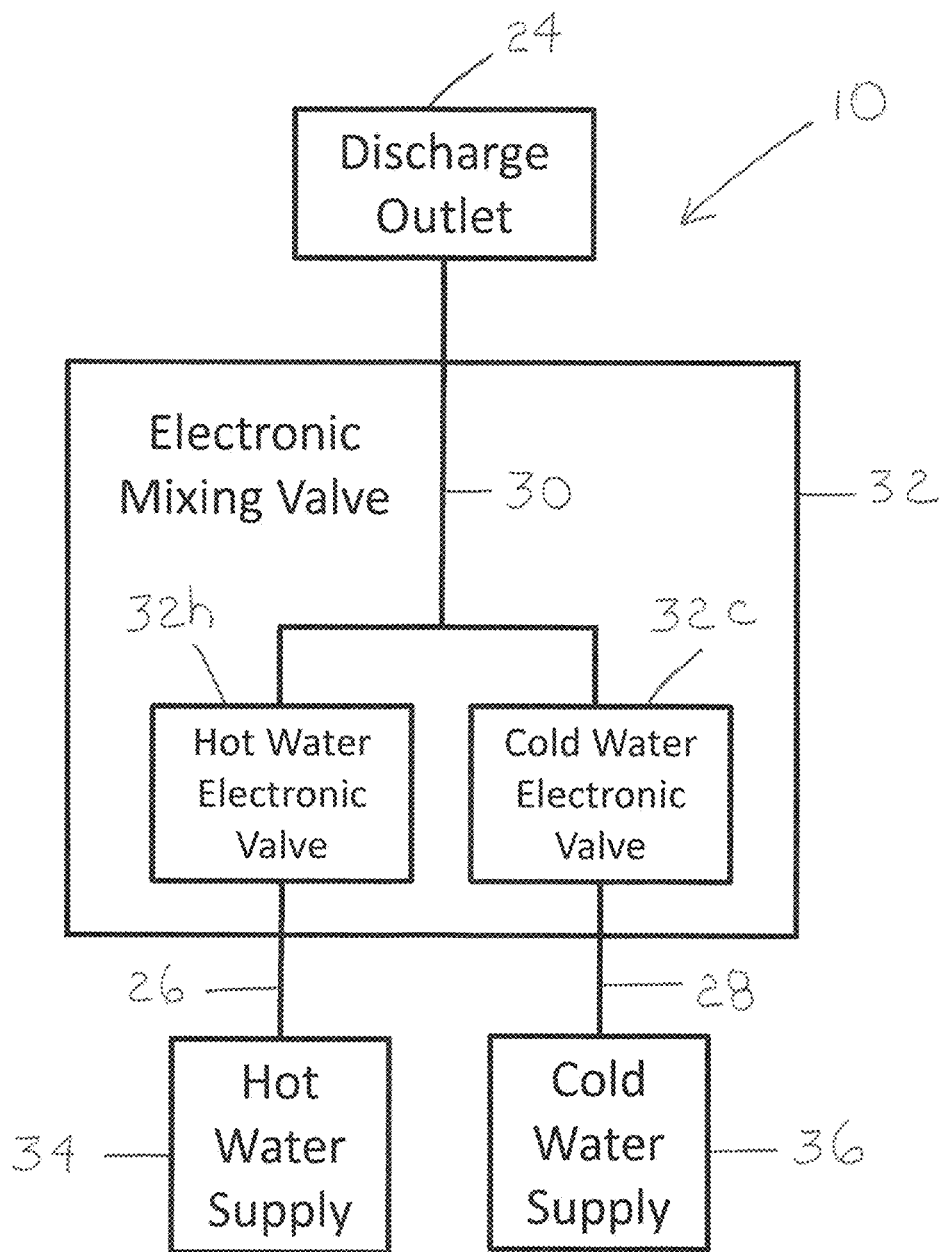
FIG. 1 is a schematic illustration of fluidic components of an electronic plumbing fixture fitting according to an exemplary embodiment of the present invention.
Figure 2:
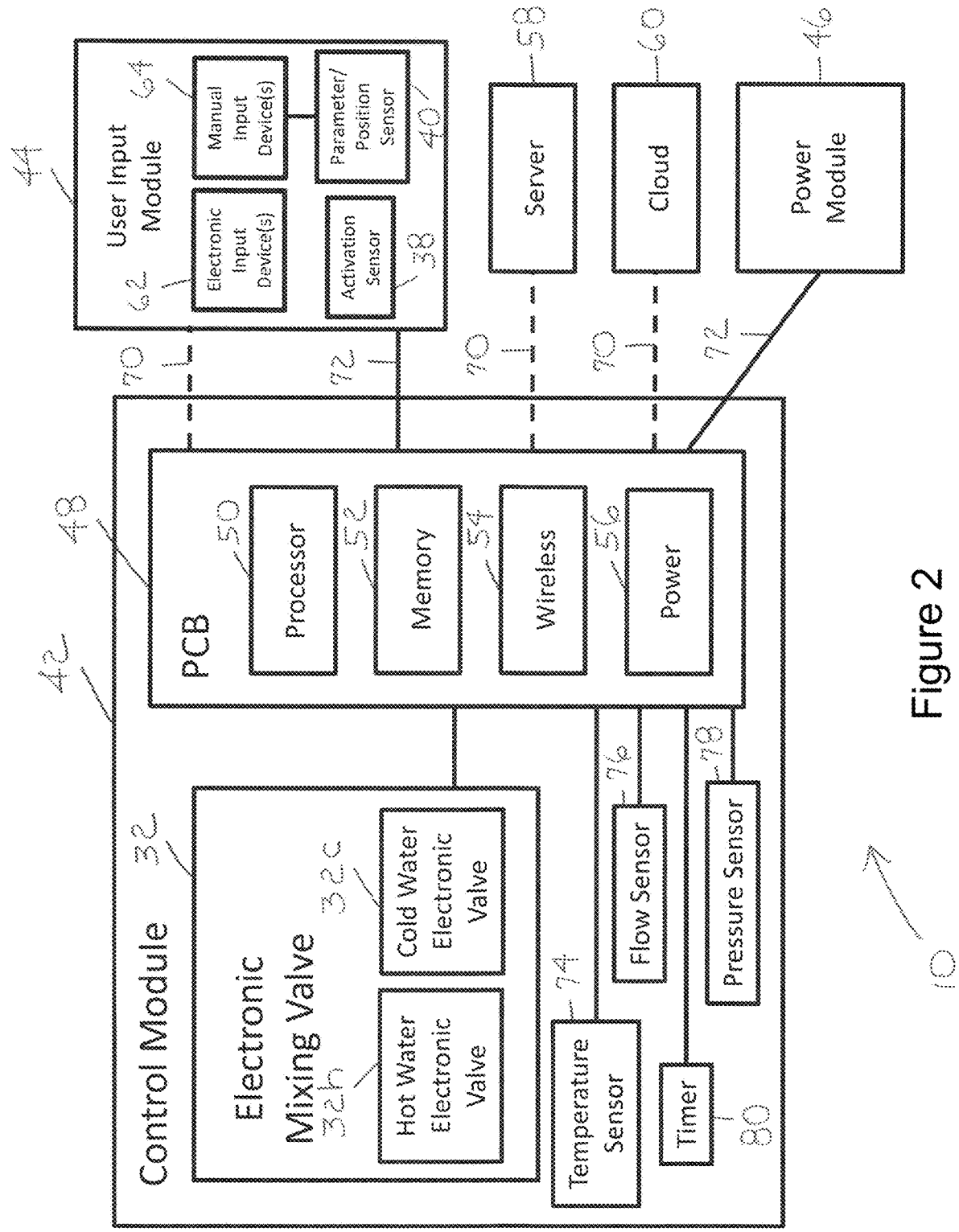
FIG. 2 is a schematic illustration of electrical/electronic components of an electronic plumbing fixture fitting according to an exemplary embodiment of the present invention.
Figure 3:
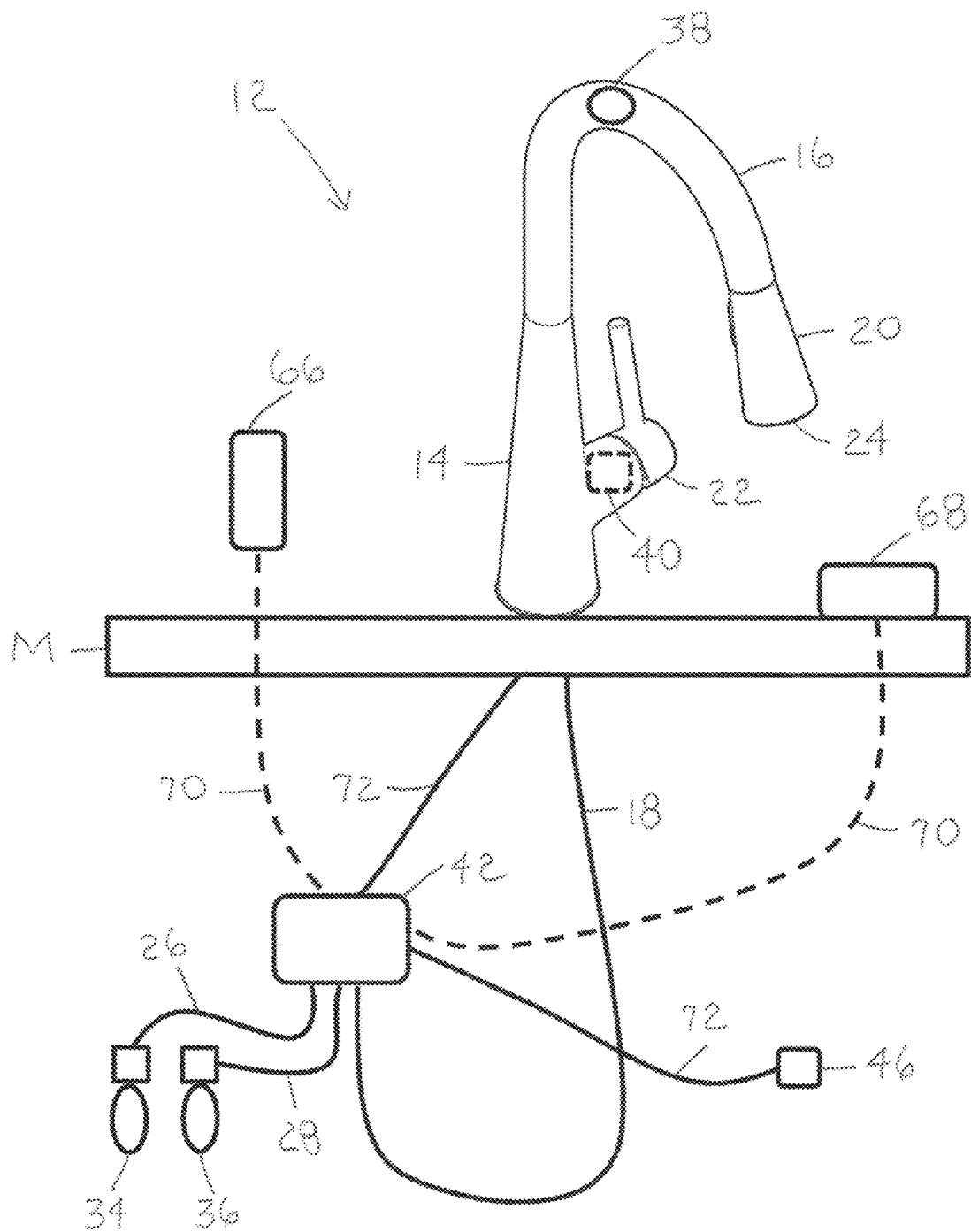
FIG. 3 is an illustration of an electronic faucet according to an exemplary embodiment of the present invention.

An exemplary embodiment of an electronic plumbing fixture fitting 10, such as an electronic faucet 12, is illustrated in FIGS. 1 and 2. FIG. 1 primarily shows the fluidic components and connections of the electronic plumbing fixture fitting 10, and FIG. 2 primarily shows the electrical/electronic components and connections of the electronic plumbing fixture fitting 10. An exemplary embodiment of the electronic faucet 12 is illustrated in FIG. 3. FIG. 3 shows the fluidic and electrical/electronic components of the electronic faucet 12.

In the illustrated embodiments, as best shown in FIG. 3, the faucet 12 includes a hub 14, a spout 16, a wand hose 18, a wand 20, and a handle 22. An upstream end of the hub 14 is connected to a mounting surface M (such as a counter or sink). An upstream end of the spout 16 is connected to a downstream end of the hub 14. The spout 16 is operable to rotate relative to the hub 14. The wand hose 18 extends through the hub 14 and the spout 16 and is operable to move within the hub 14 and the spout 16. An upstream end of the wand 20 is mounted in a downstream end of the spout 16 and is connected to a downstream end of the wand hose 18. A downstream end of the wand 20 includes a discharge outlet 24 through which water is delivered from the faucet 12. The wand 20 is operable to pull away from the spout 16. The handle 22 is connected to a side of the hub 14 and is operable to move relative to the hub 14. Although the faucet 12 has been described as having a rotatable spout 16, a pull-out or pull-down wand 20, and a handle 22 mounted on the hub 14, one of ordinary skill in the art will appreciate that, in certain embodiments, the spout 16 could be fixed relative to the hub 14, the faucet 12 may not include a wand 20, the handle 22 could be mounted on other locations on the faucet 12 or remote from the faucet 12, the faucet 12 could include more than one handle 22, the handle 22 could be any mechanical actuation device or user interface, and/or the faucet 12 may not include a handle 22.

Additionally, in the illustrated embodiments, as best shown in FIGS. 1 and 3, the fitting 10 and the faucet 12 include a hot water line 26, a cold water line 28, a mixed water line 30, and an electronic valve 32. In the illustrated embodiments, the electronic valve 32 is an electronic mixing valve that includes a hot water electronic valve 32h and a cold water electronic valve 32c.

An upstream end of the hot water line 26 connects to a hot water supply 34, and an upstream end of the cold water line 28 connects to a cold water supply 36. A downstream end of the hot water line 26 connects to the electronic valve 32, and a downstream end of the cold water line 28 connects to the electronic valve 32. More particularly, a downstream end of the hot water line 26 connects to the hot water electronic valve 32h, and a downstream end of the cold water line 28 connects to the cold water electronic valve 32c.

An upstream end of the mixed water line 30 connects to the electronic valve 32. More particularly, an upstream end of the mixed water line 30 connects to the hot water electronic valve 32h and the cold water electronic valve 32c. A downstream end of the mixed water line 30 connects to the discharge outlet 24. In the illustrated embodiments, at least a portion of the mixed water line 30 is the wand hose 18. As stated above, the downstream end of the wand hose 18 connects to the upstream end of the wand 20, and the downstream end of the wand 20 includes the discharge outlet 24 through which water is delivered from the faucet 12.

In the illustrated embodiments, each portion of the hot water line 26, the cold water line 28, and the mixed water line 30 is shown as including at least one hose, pipe, or passage. However, one of ordinary skill in the art will appreciate that each portion of the hot water line 26, the cold water line 28, and the mixed water line 30 could include more than one hose, pipe, or passage. Similarly, each portion of the hot water line 26, the cold water line 28, and the mixed water line 30 could include a combination of hose(s), pipe(s), and/or passage(s). In an exemplary embodiment, the hoses are flexible hoses. However, one of ordinary skill in the art will appreciate that other types of hoses could be used. If a portion of the hot water line 26, the cold water line 28, or the mixed water line 30 includes more than one hose, pipe, and/or passage, the hose(s), pipe(s), and/or passage(s) are connected via connectors. In an exemplary embodiment for the flexible hoses, the connectors are push-fit connectors. However, one of ordinary skill in the art will appreciate that other types of connectors could be used.

When reference is made to one component of the fitting 10 or the faucet 12 connecting to another component of the fitting 10 or the faucet 12, the connection may be direct or indirect. One of ordinary skill in the art will appreciate that additional components may be needed if the connection is indirect.

In the illustrated embodiments, the fitting 10 and the faucet 12 include the electronic valve 32 and, more particularly, the hot water electronic valve 32h and the cold water electronic valve 32c. However, one of ordinary skill in the art will appreciate that the fitting 10 and the faucet 12 could include one or more electronic valves. Additionally, the fitting 10 and the faucet 12 could include one or more mechanical valves, either in parallel or in series with the electronic valve(s). Further, although the fitting 10 and the faucet 12 have been described as including the electronic valve 32 that is an electronic mixing valve, one of ordinary skill in the art will appreciate that the fitting 10 and the faucet 12 could include just the hot water electronic valve 32h or just the cold water electronic valve 32c.

In an exemplary embodiment, the hot water electronic valve 32h and the cold water electronic valve 32c are proportional valves and, more specifically, stepper motor actuated valves. However, one of ordinary skill in the art will appreciate that the hot water electronic valve 32h and the cold water electronic valve 32c could be any type of electronic valves, including, but not limited to, solenoid valves and electronic throttle valves.

In the illustrated embodiments, as best shown in FIG. 3, the fitting 10 and the faucet 12 includes an activation sensor 38, such as a toggle sensor. In an exemplary embodiment, the activation sensor 38 is a proximity sensor and, in particular, an infrared sensor. The activation sensor 38 is also referred to as a latching sensor and a sustained-flow sensor. In the illustrated embodiment, the activation sensor 38 is mounted on an apex of the spout 16. The activation sensor 38 defines an activation zone. In an exemplary embodiment, the activation sensor 38 is operable to activate the hot water electronic valve 32h and the cold water electronic valve 32c when an object enters the activation zone and to deactivate the hot water electronic valve 32h and the cold water electronic valve 32c when the object exits and reenters the activation zone. As used herein, an "object" can be any portion of a user's body or any item used by the user to trigger the activation sensor 38. In an exemplary embodiment, the activation zone extends generally upwardly from the activation sensor 38. Additionally, in an exemplary embodiment, the activation zone has a generally cone-like shape.

As described above, the activation sensor 38 is a proximity sensor and, in particular, an infrared sensor. Proximity sensors are sensors that detect the presence of an object without any physical contact. However, one of ordinary skill in the art will appreciate that the activation sensor 38 could be any type of electronic sensor that can be triggered, including, but not limited to, other proximity sensors, touch sensors, and image sensors. Exemplary electronic sensors include, but are not limited to, electromagnetic radiation sensors (such as optical sensors and radar sensors), capacitance sensors, inductance sensors, piezo-electric sensors, and multi-pixel optical sensors (such as camera sensors). As further described above, the activation sensor 38 is mounted on the apex of the spout 16. However, one of ordinary skill in the art will appreciate that the activation sensor 38 could be mounted in any location on the faucet 12 or in a location remote from the faucet 12.

Similarly, as described above, the activation sensor 38 is a toggle sensor. However, one of ordinary skill in the art will appreciate that the activation sensor 38 could be any type of sensor that provides information useful in determining whether to activate or deactivate the hot water electronic valve 32h and the cold water electronic valve 32c, including, but not limited to, flow sensors, pressure sensors, temperature sensors, and position sensors.

In the illustrated embodiments, the handle 22 operates as it would with a standard faucet. In other words, the handle 22 can be moved between various positions to indicate a desired temperature, flow rate, and/or volume of water discharged from the faucet 12.

In the illustrated embodiments, as best shown in FIG. 3, although the handle 22 does not control a mechanical valve, the handle 22 operates as it would with a standard faucet. In other words, the handle 22 can be moved between various positions to indicate a desired temperature, flow rate, and/or volume of water discharged from the faucet 12.

More specifically, with regard to the temperature of water, the handle 22 can be rotated about a longitudinal axis of a side opening in the hub 14. At one extent of a range of rotation, the position of the handle 22 indicates all hot water (a full hot position). At the other extent of the range of rotation, the position of the handle 22 indicates all cold water (a full cold position). In between the extents of the range of rotation, the position of the handle 22 indicates a mix of hot and cold water (mixed temperature positions) with hotter temperature water as the position nears the full hot extent of the range of rotation and colder temperature water as the position nears the full cold extent of the range of rotation.

With regard to the flow rate/volume of water, the handle 22 can be moved toward and away from the side opening in the hub 14. At one extent of a range of movement, the position of the handle 22 indicates no flow rate/volume of water (a full closed position). At the other extent of the range of movement, the position of the handle 22 indicates full flow rate/volume of water (a full open position). In between the extents of the range of movement, the position of the handle 22 indicates an intermediate flow rate/volume of water (less than full open positions) with reduced flow rate/volume of water as the position nears the full closed extent of the range of movement and increased flow rate/volume of water as the position nears the full open extent of the range of movement.

In an exemplary embodiment, the faucet 12 is operable to detect movement of the handle 22 and to provide information to set at least one parameter of water flowing through the hot water electronic valve 32h and the cold water electronic valve 32c based on the movement of the handle 22. The faucet 12 is operable to detect movement of the handle 22 either directly or indirectly. In an exemplary embodiment, based on the movement of the handle 22, the faucet 12 provides information to set a temperature, flow rate, and/or volume of water flowing through the hot water electronic valve 32h and the cold water electronic valve 32c.

Further, in the illustrated embodiments, as best shown in FIG. 3, the faucet 12 includes a parameter or position sensor 38. In an exemplary embodiment, the parameter or position sensor 38 is operable to detect a state of the handle 22, such as a position or a movement of the handle 22, and to provide information to set at least one parameter of water flowing through the hot water electronic valve 32h and the cold water electronic valve 32c based on the state of the handle 22, such as the position or the movement of the handle 22. The parameter or position sensor 38 is operable to detect the state of the handle 22, such as the position or the movement of the handle 22, ranging from the full hot position through the full cold position and from the full closed position through the full open position. The parameter or position sensor 38 is operable to detect the state of the handle 22, such as the position or the movement of the handle 22, either directly or indirectly. In an exemplary embodiment, based on the state of the handle 22, such as the position or the movement of the handle 22, the parameter or position sensor 38 provides information to set a temperature, flow rate, and/or volume of water flowing through the hot water electronic valve 32h and the cold water electronic valve 32c.

An electronic plumbing fixture fitting, such as an electronic faucet, including a parameter or position sensor that is operable to detect movement of a handle and to provide information to set at least one parameter (such as a temperature and/or a volume) of water flowing through a hot water electronic valve and a cold water electronic valve based on movement of the handle is disclosed in U.S. Pat. No. 9,212,473, assigned to Moen Incorporated, the entire disclosure of which is hereby incorporated by reference.

Further, in the illustrated embodiments, as best shown in FIGS. 2 and 3, the fitting 10 and the faucet 12 include a control module 42, a user input module 44, and a power module 46.

The flow components of the control module 42 include a number of inlets and outlets and a number of flow passages. These inlets/outlets and flow passages enable the easy management of the flow between the incoming flows (i.e., the hot water line 26 and the cold water line 28) and the outgoing flow (i.e., the mixed water line 30 or the wand hose 18).

In the illustrated embodiments, as best shown in FIG. 3, the control module 42 is operable to mount below the mounting surface M (such as the counter or sink). In an exemplary embodiment, the control module 42 is operable to mount on a mounting shank of the fitting 10 or the faucet 12. In the illustrated embodiments, the electronic valve 32 is located inside the control module 42. In the illustrated embodiments, the control module 42 includes a top or first side and a bottom or second side. The first side is opposite the second side. In the illustrated embodiments, the second side includes openings for hoses and flow passages.

In the illustrated embodiments, as best shown in FIG. 2, the control module 42 further includes a number of electronic components. These components enable the operation of the fitting 10 or the faucet 12. More specifically, these components enable the activation, deactivation, and control of the electronic valve 32 through user input. The control module 42 includes the electronic valve 32 and a printed circuit board ("PCB") 48. In the illustrated embodiments, a number of electronic components are mounted on the PCB 48, including, but not limited to, a processor 50, memory 52, a wireless communication chip 54, and a power port 56. The processor 50 receives signals from and sends signals to the components of the fitting 10 or the faucet 12 to control operation of the fitting 10 or the faucet 12. For example, the processor 50 receives signals from sensors (described above and to be described in greater detail below) and sends signals to the electronic valve 32 to activate, deactivate, and control the electronic valve 32. The memory 52 can save information received from the components of the fitting 10 or the faucet 12. The information can also be saved in remote memory. Exemplary storage locations for the remote memory include the user input module 44 (where the user input module 44 includes memory, such as an Apple iPhone and a Google Android phone), a centralized server provided by the fitting/faucet manufacturer, and a cloud service provided by the fitting/faucet manufacturer or a third party (such as Google, HomeKit, and IFTTT). In the illustrated embodiments, the remote memory includes a server 58 and a cloud 60.

In the illustrated embodiments, as best shown in FIGS. 2 and 3, the user input module 44 provides operational instructions to the electronic components of the fitting 10 or the faucet 12. The user input module 44 can be any module that enables user input. The user input module 44 includes electronic input device(s) 62 and manual input device(s) 64. Exemplary electronic input devices 62 include activation sensors, mobile devices, voice controlled devices, touch screen devices, and push button devices. In the illustrated embodiments, the user input module 44 includes the activation sensor 38, a mobile device 66, and a voice controlled device 68. Exemplary manual input devices 64 include handles and joysticks. In the illustrated embodiments, the user input module 44 includes the handle 22. The user input module 44 receives input from a user and sends signals to the control module 42 or other electronic components of the fitting 10 or the faucet 12 to control operation of the components of the fitting 10 or the faucet 12. For example, the user input module 44 receives input from a user and sends signals to the processor 50 to activate, deactivate, and control the electronic valve 32. In the illustrated embodiments, some components of the user input module 44 (e.g., the mobile device 66 and the voice controlled device 68) are connected to the control module 42 via a wireless communication connection 70 (such as a Wi-Fi connection), while other components of the user input module 44 (e.g., the activation sensor 38 and the parameter or position sensor 38) are connected to the control module 42 via a hard-wired connection 72. In the illustrated embodiments, some components of the user input module 44 (e.g., the mobile device 66 and the voice controlled device 68) send the signals to and/or receive signals from the processor 50 via the wireless communication connection 70 (such as the Wi-Fi connection), while other components of the user input module 44 (e.g., the activation sensor 38 and the parameter or position sensor 38) send signals to and/or receive signals from the processor 50 via the hard-wired connection 72. However, one of ordinary skill in the art will appreciate that each component of the user input module 44 could be connected to the control module 42 and send signals to and/or receive signals from the processor 50 via any type of connection, including other wireless communication connections, such as Bluetooth, cellular, near field communication (NFC), Zigbee, and Z-Wave, or a hard-wired connection. In the illustrated embodiments, as best shown in FIG. 3, three electronic input devices 62 and one manual input device 64 are shown, i.e., the activation sensor 38 on the faucet 12, the mobile device 66 that can be held or moved by the user, the voice controlled device 68 located on the mounting surface M, and the handle 22 connected to the hub 14 of the faucet 12 located on the mounting surface M. However, one of ordinary skill in the art will appreciate that the user input module 44 could include any number of components. Moreover, each component of the user input module 44 could be in any location where it can send signals to and/or receive signals from the control module 42 and/or other electronic components of the fitting 10 or the faucet 12, such as the processor 50, or each component of the user input module 44 could be integrally formed with or physically connected to the fitting 10 or the faucet 12.

In the illustrated embodiments, as best shown in FIGS. 2 and 3, the power module 46 provides power to the electrical/electronic components of the fitting 10 or the faucet 12. In the illustrated embodiments, the power module 46 is operable to mount below the mounting surface M. In the illustrated embodiments, the power module 46 is connected to the control module 42 via the hard-wired connection 72. In an exemplary embodiment, the power module 46 includes battery power. In an exemplary embodiment, the power module 46 includes AC power.

During operation of the electronic valve 32, the user activates, deactivates, and controls the electronic valve 32 using the user input module 44. When the user appropriately triggers the user input module 44, the electronic valve 32 is activated, deactivated, or otherwise controlled. For example, the user could trigger the user input module 44 by triggering the activation sensor 38, pressing an appropriate button on the mobile device 66, stating specific commands to the voice controlled device 68, and/or opening, closing, and/or moving the handle 22. For voice control, when the user says "turn on the faucet," the electronic valve 32 is activated. Similarly, when the user says "turn off the faucet," the electronic valve 32 is deactivated. Further, when the user says "increase temperature," "decrease temperature," "increase flow," or "decrease flow," the electronic valve 32 is controlled to accomplish the requested action. The commands can be predetermined. Additionally, the commands can be customizable. For example, the user could activate the electronic valve 32 by saying "start flow" instead of "turn on the faucet." Similarly, the user could deactivate the electronic valve 32 by saying "stop flow" instead of "turn off the faucet."

As used herein, "activate a valve" means to move the valve to or maintain the valve in an open position, regardless of the volume or temperature of the flowing water, and "deactivate a valve" means to move the valve to a completely closed position.

When reference is made to activating or deactivating the electronic valve 32 "when the user appropriately triggers the user input module 44," the electronic valve 32 may be activated or deactivated immediately upon the user input module 44 being triggered or a predetermined period of time after the user input module 44 has been triggered.

In the illustrated embodiments, the fitting 10 and the faucet 12 include sensors. In the illustrated embodiments, the sensors include the activation sensor 38, the parameter or position sensor 38, a temperature sensor 74, a flow sensor 76, and a pressure sensor 78. The activation sensor 38 and the parameter or position sensor 38 were described above. The temperature sensor 74 is operable to detect a temperature of water in the hot water line 26, the cold water line 28, the electronic valve 32, and/or the mixed water line 30 or wand hose 18. The flow sensor 76 is operable to detect a flow rate of water in the hot water line 26, the cold water line 28, the electronic valve 32, and/or the mixed water line 30 or wand hose 18. The pressure sensor 78 is operable to detect a pressure of water in the hot water line 26, the cold water line 28, the electronic valve 32, and/or the mixed water line 30 or wand hose 18. The sensors send signals to the processor 50 indicating the detected information.

The information detected by the sensors is used to control the operation of the fitting 10 or the faucet 12. The information detected by the activation sensor 38 can be used to activate and deactivate the fitting 10 or the faucet 12. The information detected by the parameter or position sensor 38 can be used to determine a temperature, flow rate, and/or volume of water desired by the user. The information detected by the temperature sensor 74 can be used to maintain a temperature of water discharged from the fitting 10 or the faucet 12. The information detected by the flow sensor 76 can be used to determine if there is flow or maintain a flow rate of water discharged from the fitting 10 or the faucet 12. The information detected by the pressure sensor 78 can be used to maintain a pressure or determine a volume of water discharged from the fitting 10 or the faucet 12.

In the illustrated embodiments, the fitting 10 and the faucet 12 include a timer 80. The timer 80 is operable to measure time intervals. For example, the timer 80 can measure a time interval from an activation of the fitting 10 or the faucet 12 through a deactivation of the fitting 10 or the faucet 12.

Demonstration Feature

In an exemplary embodiment, the fitting 10 or the faucet 12 includes a demonstration feature. In an exemplary embodiment, the user input module 44 includes a mechanism to receive from the user numerical value(s) of parameter(s) for the water to be delivered through the discharge outlet 24 of the fitting 10 or the faucet 12 (e.g., temperature, volume, and/or flow rate) and a mechanism to demonstrate to the user the numerical value(s) of parameter(s) via the water delivered through the discharge outlet 24 of the fitting 10 or the faucet 12.

Demonstrating and Changing—Embodiment 1

Figure 4:
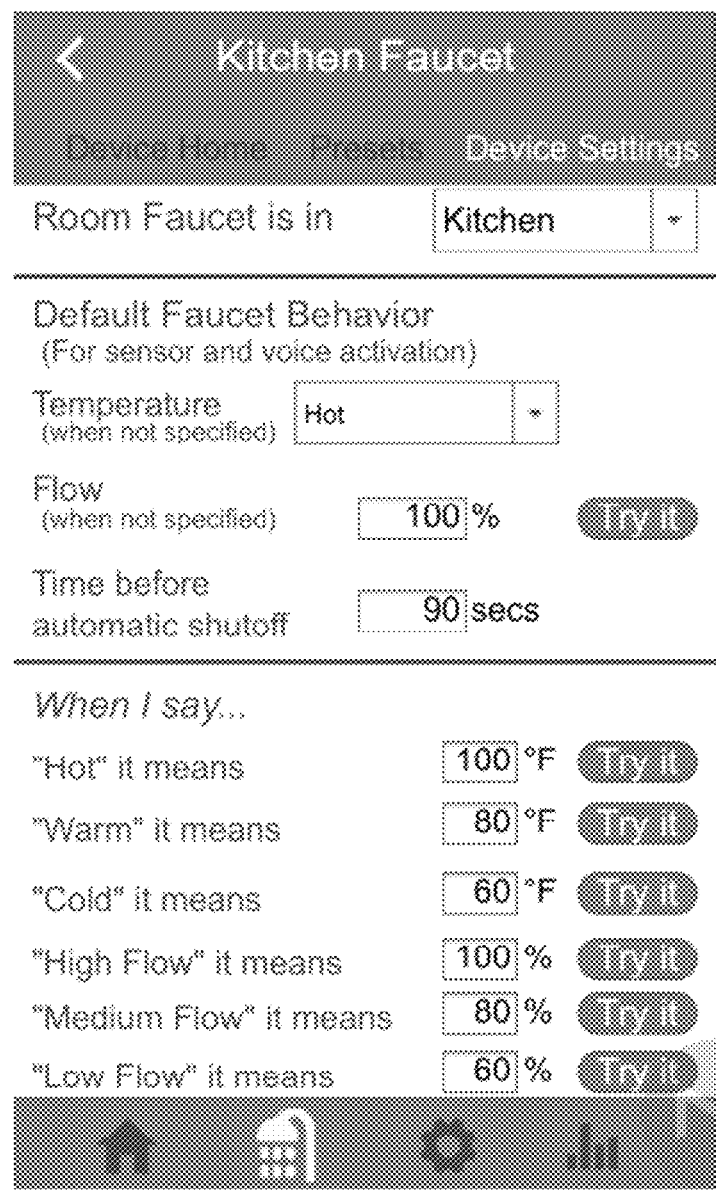
FIGS. 4-7 are illustrations of a mobile device displaying information relating to a demonstration feature of an electronic plumbing fixture fitting according to an exemplary embodiment of the present invention.
Figure 5:
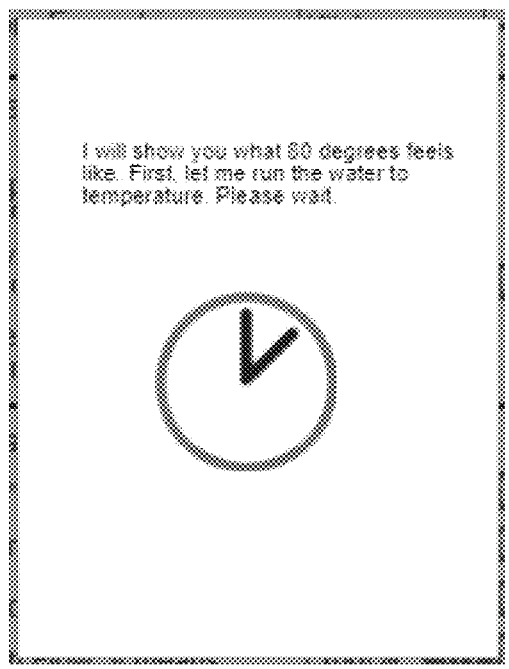
Figure 6:

In an exemplary embodiment for demonstrating a temperature, the user input module 44 receives from the user a desired numerical value of the temperature of water to be delivered through the discharge outlet 24 of the fitting 10 or the faucet 12 and displays the desired numerical value of the temperature and a "Try it" button near the desired numerical value of the temperature (see FIG. 4). If the user presses the "Try it" button, the user input module 44 sends a signal to the processor 50 indicating the desired temperature. The processor 50 receives the signal from the user input module 44 and sends a signal to the electronic valve 32 to activate. As a result, water will be delivered through the discharge outlet 24 of the fitting 10 or the faucet 12. The temperature sensor 74 detects the temperature of the water being delivered and sends a signal to the processor 50 indicating the detected temperature. The processor 50 receives the signal from the temperature sensor 74. If the detected temperature is not approximately the same as the desired temperature, the processor 50 sends a signal to the electronic valve 32 to control the temperature of the water being delivered (e.g., decrease or increase the temperature based on whether the detected temperature is above or below the desired temperature). Additionally, if the detected temperature is not approximately the same as the desired temperature, the user input module 44 displays a message such as the following to the user: "I will show you what [the desired temperature] feels like. First, let me run the water to the temperature. Please wait." (see FIG. 5). The temperature sensor 74 continues to detect the temperature of the water being delivered and sends signals to the processor 50 indicating the detected temperatures, and the processor 50 receives the signals from the temperature sensor 74 and sends signals to the electronic valve 32 to control the temperature of the water being delivered, until the detected temperature is approximately the same as the desired temperature. Once the detected temperature is approximately the same as the desired temperature, the user input module 44 displays a message such as the following to the user: "Water is now running at [the desired temperature]." (see FIG. 6). The user input module 44 could also display a "Stop Water" button (see FIG. 6). If the user is satisfied with the demonstrated temperature, the user presses the "Stop Water" button. If the user presses the "Stop Water" button, the user input module 44 sends a signal to the processor 50 indicating the user is satisfied with the demonstrated temperature. The processor 50 receives the signal from the user input module 44, receives a signal from the temperature sensor 74 indicating the demonstrated temperature, and saves the demonstrated temperature or sends a signal to another component of the fitting 10 or the faucet 12 to save the demonstrated temperature.

Figure 7:
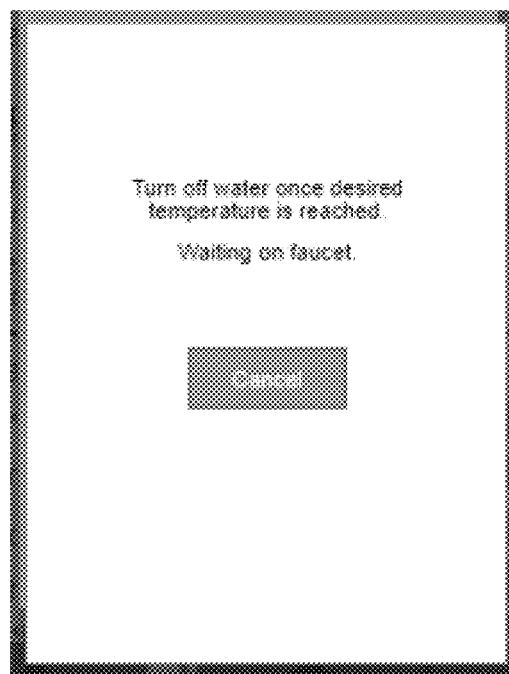

In an exemplary embodiment for changing the demonstrated temperature, the user input module 44 displays a message asking the user if they want to change the desired temperature of water to be delivered through the discharge outlet 24 of the fitting 10 or the faucet 12 and instructs the user how to change the desired temperature. For example, the user input module 44 could instruct the user to move the handle 22 to the desired temperature or to input the desired temperature via a button on the display. In the exemplary embodiment with the handle 22, the user input module 44 displays a message such as the following to the user: "Want it hotter or colder? Adjust handle to temperature of your preference." (see FIG. 6). If the user desires to change the demonstrated temperature, the user input module 44 waits to receive the new desired temperature from the user. In the exemplary embodiment with the handle 22, the user input module 44 displays a message such as the following to the user: "Turn off water once the desired temperature is reached. Waiting on faucet." (see FIG. 7). Once the user input module 44 receives the new desired temperature from the user, the user input module 44 sends a signal to the processor 50 indicating the new desired temperature. The processor 50 receives the signal from the user input module 44 and sends a signal to the electronic valve 32 to control the temperature of the water being delivered (e.g., decrease or increase the temperature based on whether the detected temperature is above or below the new desired temperature). The temperature sensor 74 continues to detect the temperature of the water being delivered and sends signals to the processor 50 indicating the detected temperatures, and the processor 50 receives the signals from the temperature sensor 74 and sends signals to the electronic valve 32 to control the temperature of the water being delivered, until the detected temperature is approximately the same as the new desired temperature. Messages similar to those displayed during the demonstration of the original desired temperature could be display during the demonstration of the new desired temperature.

These steps can be repeated until the user is satisfied with the demonstrated temperature. The user input module 44 sends a signal to the processor 50 indicating that the user is satisfied with the demonstrated temperature. The processor 50 receives the signal from the user input module 44, receives a signal from the temperature sensor 74 indicating the final demonstrated temperature, and saves the final demonstrated temperature or sends a signal to another component of the fitting 10 or the faucet 12 to save the final demonstrated temperature. The user input module 44 could also display the final demonstrated temperature to the user.

Additionally, during the demonstration of the original desired temperature and/or the changed desired temperature, the user input module 44 could display a current temperature prior to the water reaching the desired temperature.

In an exemplary embodiment for demonstrating a volume, the user input module 44 displays a desired volume of water to be delivered through the discharge outlet 24 of the fitting 10 or the faucet 12 and displays a "Try it" button near the desired temperature (see FIG. 4). If the user presses the "Try it" button, the user input module 44 sends a signal to the processor 50 indicating the desired volume. The processor 50 receives the signal from the user input module 44 and sends a signal to the electronic valve 32 to activate. As a result, water will be delivered through the discharge outlet 24 of the fitting 10 or the faucet 12. The flow sensor 76 detects the volume of the water being delivered and sends a signal to the processor 50 indicating the detected volume. The processor 50 receives the signal from the flow sensor 76 and sends a signal to the electronic valve 32 to deactivate once the detected volume is approximately the same as the desired volume.

With the demonstration of a desired temperature, there is a two-way communication between the user input module 44 and the processor 50. With the demonstration of a desired volume, there is a one-way communication between the user input module 44 and the processor 50.

Demonstrating and Changing—Embodiment 2

Figure 8:
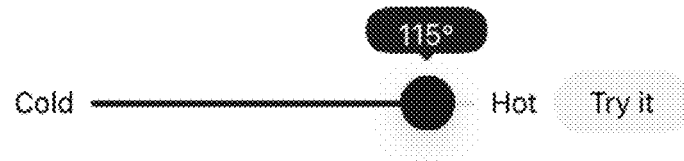
FIGS. 8-10 are illustrations of a mobile device displaying information relating to a demonstration feature of an electronic plumbing fixture fitting according to another exemplary embodiment of the present invention.
Figure 8:
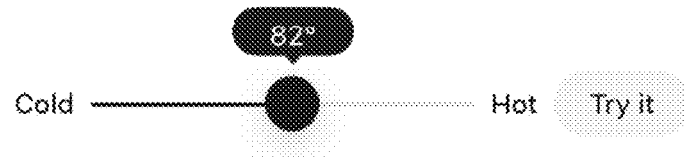
Figure 8:
Figure 9:
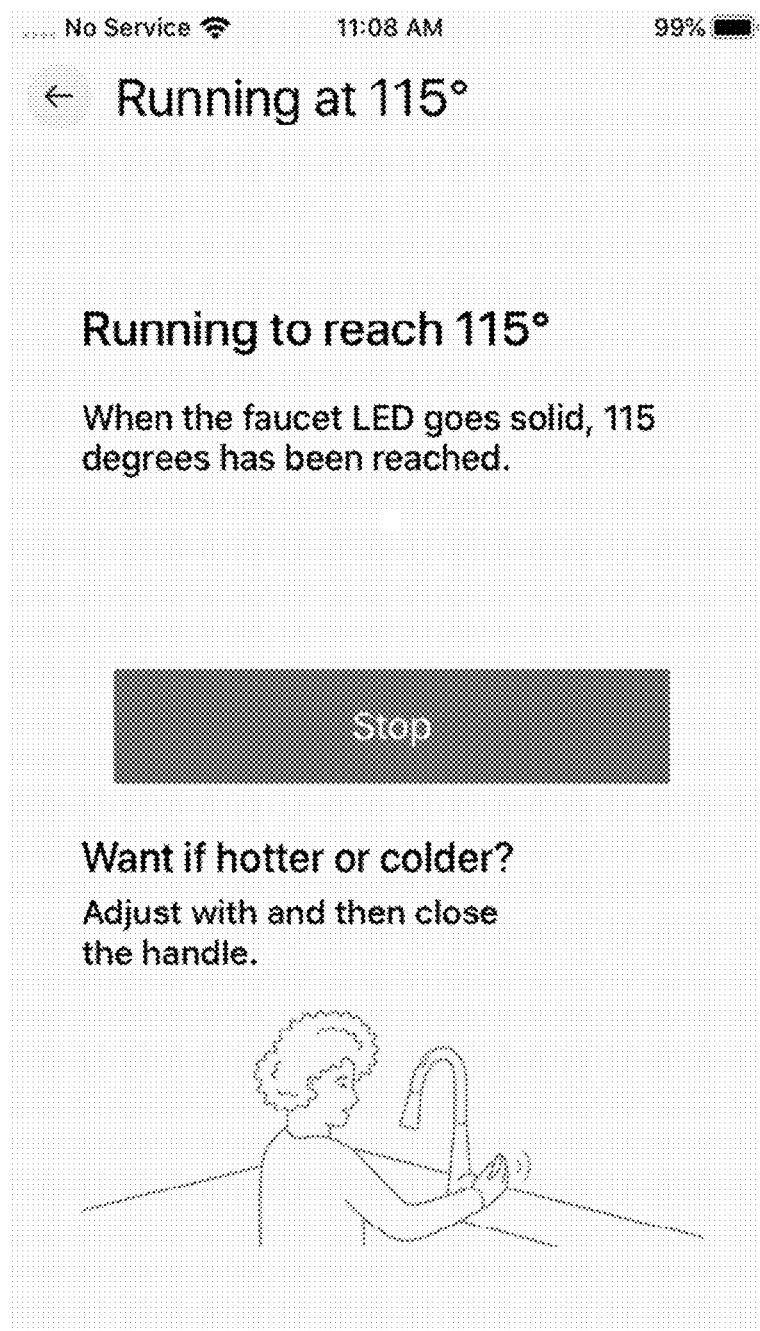

In another exemplary embodiment for demonstrating a temperature, the user input module 44 receives from the user a desired numerical value of the temperature of water to be delivered through the discharge outlet 24 of the fitting 10 or the faucet 12 and displays the desired numerical value of the temperature and a "Try it" button near the desired numerical value of the temperature (see FIG. 8). If the user presses the "Try it" button, the user input module 44 sends a signal to the processor 50 indicating the desired temperature. The processor 50 receives the signal from the user input module 44 and sends a signal to the electronic valve 32 to activate. As a result, water will be delivered through the discharge outlet 24 of the fitting 10 or the faucet 12. The temperature sensor 74 detects the temperature of the water being delivered and sends a signal to the processor 50 indicating the detected temperature. The processor 50 receives the signal from the temperature sensor 74. If the detected temperature is not approximately the same as the desired temperature, the processor 50 sends a signal to the electronic valve 32 to control the temperature of the water being delivered (e.g., decrease or increase the temperature based on whether the detected temperature is above or below the desired temperature). Additionally, if the detected temperature is not approximately the same as the desired temperature, the user input module 44 displays a message such as the following to the user: "Running to reach [the desired temperature]. When the faucet LED goes solid, [the desired temperature] has been reached." (see FIG. 9). The temperature sensor 74 continues to detect the temperature of the water being delivered and sends signals to the processor 50 indicating the detected temperatures, and the processor 50 receives the signals from the temperature sensor 74 and sends signals to the electronic valve 32 to control the temperature of the water being delivered, until the detected temperature is approximately the same as the desired temperature. Once the detected temperature is approximately the same as the desired temperature, the faucet LED goes solid. The user input module 44 could also display a "Stop" button (see FIG. 9). If the user is satisfied with the demonstrated temperature (either before or after the demonstrated temperature is approximately the same as the desired temperature), the user presses the "Stop" button. If the user presses the "Stop" button, the user input module 44 sends a signal to the processor 50 indicating the user is satisfied with the demonstrated temperature. The processor 50 receives the signal from the user input module 44, receives a signal from the temperature sensor 74 indicating the demonstrated temperature, and saves the demonstrated temperature or sends a signal to another component of the fitting 10 or the faucet 12 to save the demonstrated temperature.

In another exemplary embodiment for changing the demonstrated temperature, the user input module 44 displays a message asking the user if they want to change the desired temperature of water to be delivered through the discharge outlet 24 of the fitting 10 or the faucet 12 and instructs the user how to change the desired temperature. For example, the user input module 44 could instruct the user to move the handle 22 to the desired temperature or to input the desired temperature via a button on the display. In the exemplary embodiment with the handle 22, the user input module 44 displays a message such as the following to the user: "Want it hotter or colder? Adjust with and then close handle." (see FIG. 9). If the user desires to change the demonstrated temperature, the user input module 44 waits to receive the new desired temperature from the user. Once the user input module 44 receives the new desired temperature from the user, the user input module 44 sends a signal to the processor 50 indicating the new desired temperature. The processor 50 receives the signal from the user input module 44 and sends a signal to the electronic valve 32 to control the temperature of the water being delivered (e.g., decrease or increase the temperature based on whether the detected temperature is above or below the new desired temperature). The temperature sensor 74 continues to detect the temperature of the water being delivered and sends signals to the processor 50 indicating the detected temperatures, and the processor 50 receives the signals from the temperature sensor 74 and sends signals to the electronic valve 32 to control the temperature of the water being delivered, until the detected temperature is approximately the same as the new desired temperature. Messages similar to those displayed during the demonstration of the original desired temperature could be display during the demonstration of the new desired temperature.

Figure 10:
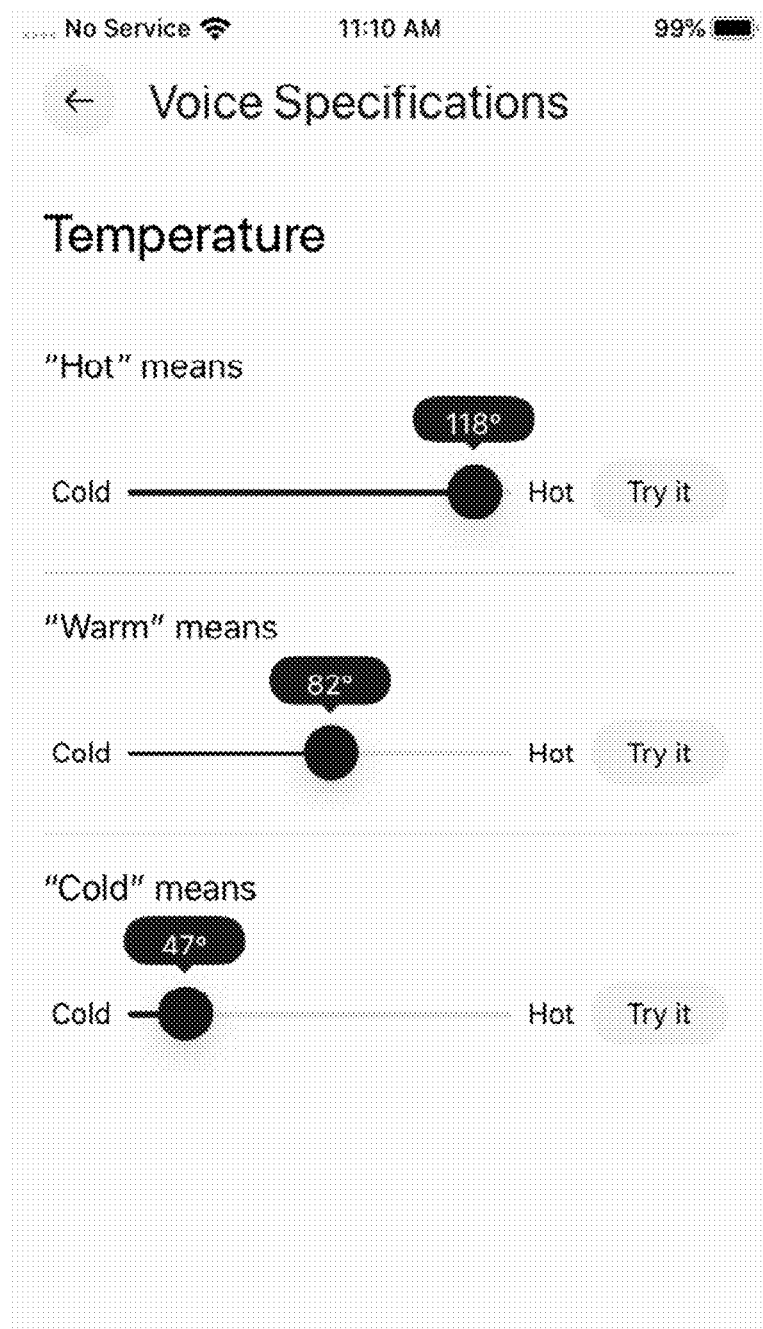

These steps can be repeated until the user is satisfied with the demonstrated temperature. The user input module 44 sends a signal to the processor 50 indicating that the user is satisfied with the demonstrated temperature. The processor 50 receives the signal from the user input module 44, receives a signal from the temperature sensor 74 indicating the final demonstrated temperature, and saves the final demonstrated temperature or sends a signal to another component of the fitting 10 or the faucet 12 to save the final demonstrated temperature. The user input module 44 could also display the final demonstrated temperature to the user (see FIG. 10).

Additionally, during the demonstration of the original desired temperature and/or the changed desired temperature, the user input module 44 could display a current temperature prior to the water reaching the desired temperature.

In the above description of the demonstration feature, steps are described as being taken until the detected temperature is approximately the same as the desired temperature (either new or changed). In an exemplary embodiment, "approximately the same as" means within ten degrees above or below the desired temperature. In an exemplary embodiment, "approximately the same as" means within five degrees above or below the desired temperature.

Preset Feature

In an exemplary embodiment, the fitting 10 or the faucet 12 includes a preset feature. A preset is saved numerical value(s) of parameter(s) for the water to be delivered through the discharge outlet 24 of the fitting 10 or the faucet 12 (e.g., temperature, volume, and/or flow rate). The user input module 44 enables the user to create and select the presets. The user input module 44 also enables the user to name the presets.

In an exemplary embodiment, the user input module 44 includes multiple mechanisms by which presets can be created. In an exemplary embodiment, the user input module 44 includes mechanisms to create presets by demonstration, manually, and from usage/recent history or session information.

In an exemplary embodiment for creating a preset, the user input module 44 includes a mechanism to receive from the user numerical value(s) of parameter(s) for the water to be delivered from the fitting 10 or the faucet 12 (e.g., temperature, volume, and/or flow rate) and a mechanism to save the numerical value(s) of parameter(s) as a preset for future selection by the user.

Create by Demonstration—Overview

In an exemplary embodiment for creating a preset by demonstration, the user input module 44 uses a wizard to walk the user through the creation of the preset. In other words, the user input module 44 displays a series of questions to the user and the user demonstrates the desired numerical value(s) of parameter(s) using the manual input device 64 (see FIG. 11). For example, the user can demonstrate the desired numerical value(s) of parameter(s) using the handle 22 of the fitting 10 or the faucet 12. The user input module 44 can also display a field for the user to input a name for the preset.

Create by Demonstration—Embodiment 1

Figure 12:
Figure 12:
Figure 12:
Figure 13:
Figure 13:
Figure 14:
Figure 14:
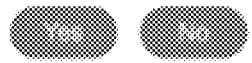
Figure 14:

In an exemplary embodiment for creating a preset for the temperature by demonstration, the user input module 44 instructs the user to demonstrate the temperature using the manual input device 64. For example, the user input module 44 displays a message such as the following: "Do you want to control the water temperature? Yes or No" (see FIG. 12). If the user selects "Yes," the user input module 44 displays a message such as the following: "Run faucet to demonstrate desired temperature. Then, turn off water." (see FIG. 13). Once the user activates the faucet 12 using the handle 22, the user input module 44 displays a message such as the following: "Waiting for faucet interaction to complete." (see FIG. 14). Once the user deactivates the faucet 12 using the handle 22, the user input module 44 displays a message such as the following: "That was [the detected temperature]."

In an exemplary embodiment for creating a preset for the volume by demonstration, the user input module 44 instructs the user to demonstrate the volume using the manual input device 64. For example, the user input module 44 displays a message such as the following: "Run faucet to demonstrate how much water. Then, turn off water." Once the user activates the faucet 12 using the handle 22, the user input module 44 displays a message such as the following: "Waiting for faucet interaction to complete." Once the user deactivates the faucet 12 using the handle 22, the user input module 44 displays a message such as the following: "That was [the detected volume]."

Figure 15:
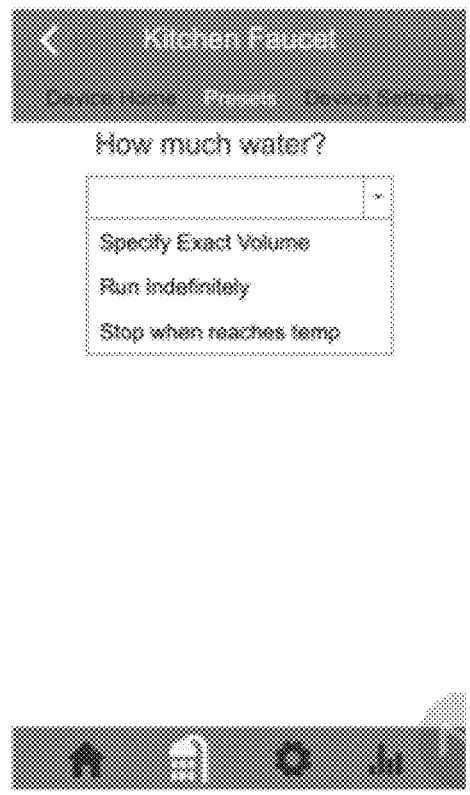
Figure 16:
Figure 16:
Figure 17:
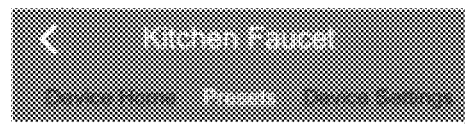
Figure 17:
Figure 17:
Figure 17:
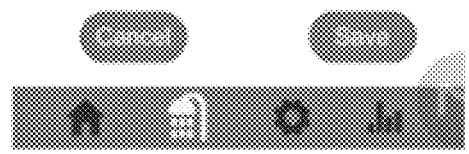

In an exemplary embodiment for creating a preset for the temperature in combination with the volume by demonstration, the user input module 44 instructs the user to demonstrate the temperature using the manual input device 64. For example, the user input module 44 displays a message such as the following: "Do you want to control the water temperature? Yes or No." (see FIG. 12). If the user selects "Yes," the user input module 44 displays a message such as the following: "Run faucet to demonstrate desired temperature. Then, turn off water." (see FIG. 13). Once the user activates the faucet 12 using the handle 22, the user input module 44 displays a message such as the following: "Waiting for faucet interaction to complete." (see FIG. 13). Once the user deactivates the faucet 12 using the handle 22, the user input module 44 displays a message such as the following: "That was [the detected temperature]. If the faucet is not already at that temperature, do you want to purge the line to get that temperature? Yes or No." (see FIG. 14). The user input module 44 then instructs the user to demonstrate the volume using the manual input device 64. For example, the user input module 44 displays a message such as the following: "How much water? Specify exact volume, Run indefinitely, or Stop when reaches temp." (see FIG. 15). If the user selects "Specify exact volume," the user input module 44 displays a message such as the following: "Dispense volume of interest and stop." (see FIG. 16). Once the user activates the faucet 12 using the handle 22, the user input module 44 displays a message such as the following: "Waiting for faucet interaction to complete." (see FIG. 16). Once the user deactivates the faucet 12 using the handle 22, the user input module 44 displays a message such as the following: "Recap: Temperature-[the detected temperature] with purge; Volume-[the detected volume]." (see FIG. 17).

Create by Demonstration—Embodiment 2

Figure 18:
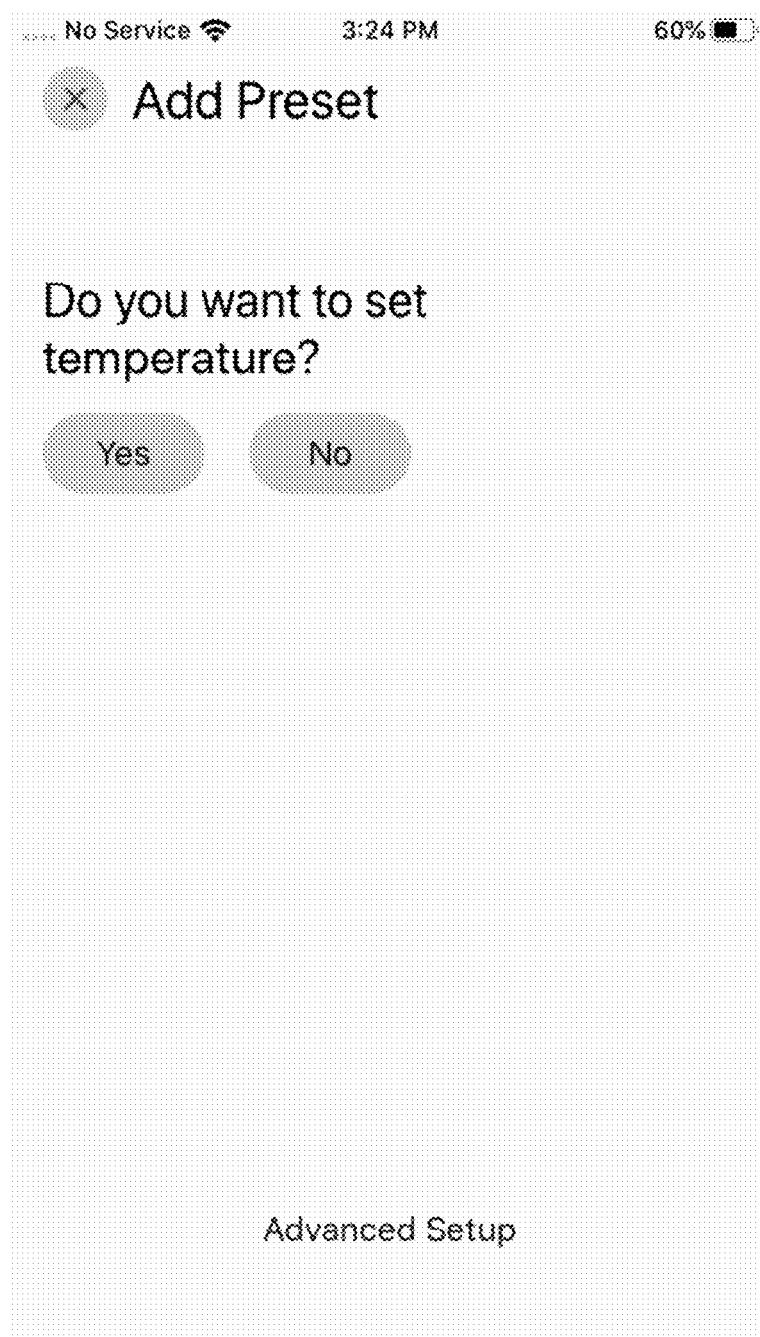
FIGS. 18-29 are illustrations of a mobile device displaying information relating to a preset feature of an electronic plumbing fixture fitting according to another exemplary embodiment of the present invention.
Figure 19:

In another exemplary embodiment for creating a preset for the temperature by demonstration, the user input module 44 instructs the user to demonstrate the temperature using the manual input device 64. For example, the user input module 44 displays a message such as the following: "Do you want to set temperature? Yes or No" (see FIG. 18). If the user selects "Yes," the user input module 44 displays a message such as the following: "Using the handle, run water and turn off once desired temperature is reached. Waiting on faucet." (see FIG. 19). Once the user activates and deactivates the faucet 12 using the handle 22, the user input module 44 displays a message such as the following: "That was [the detected temperature]."

Figure 20:
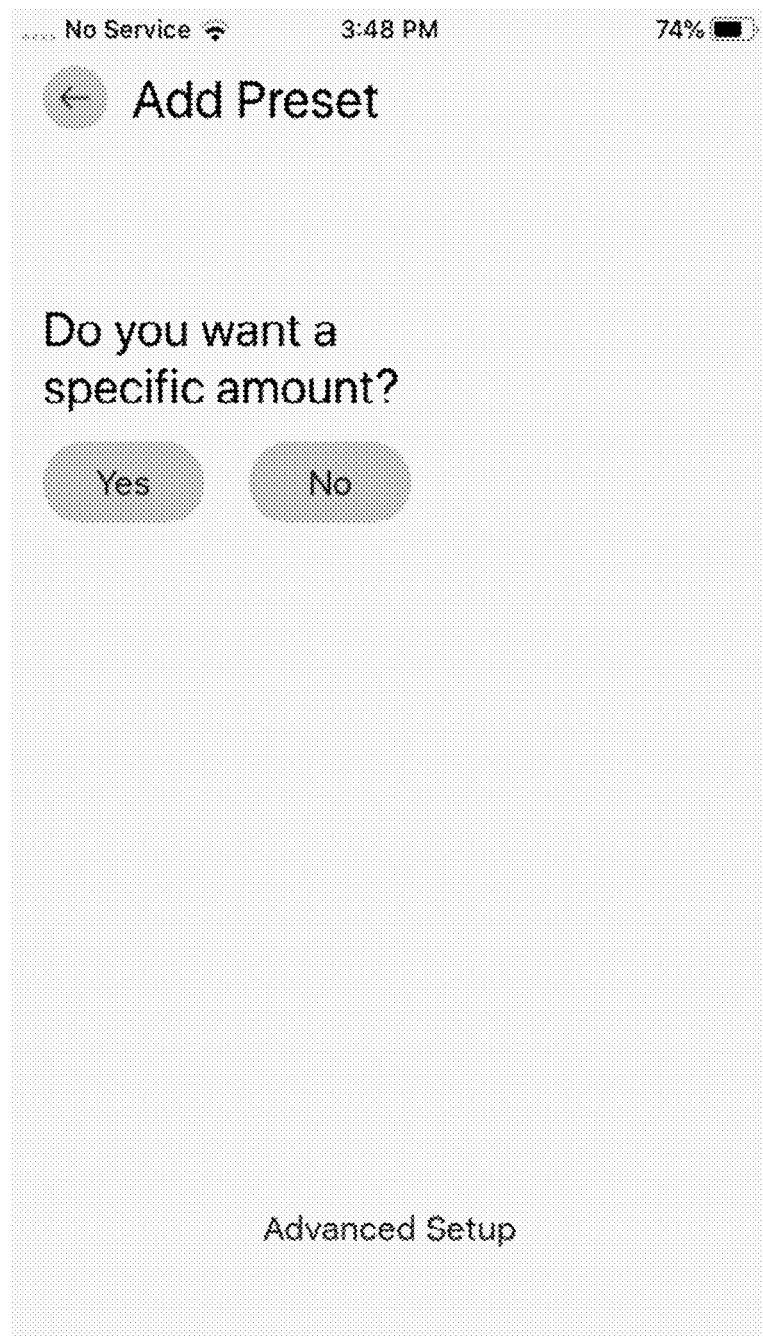
Figure 21:
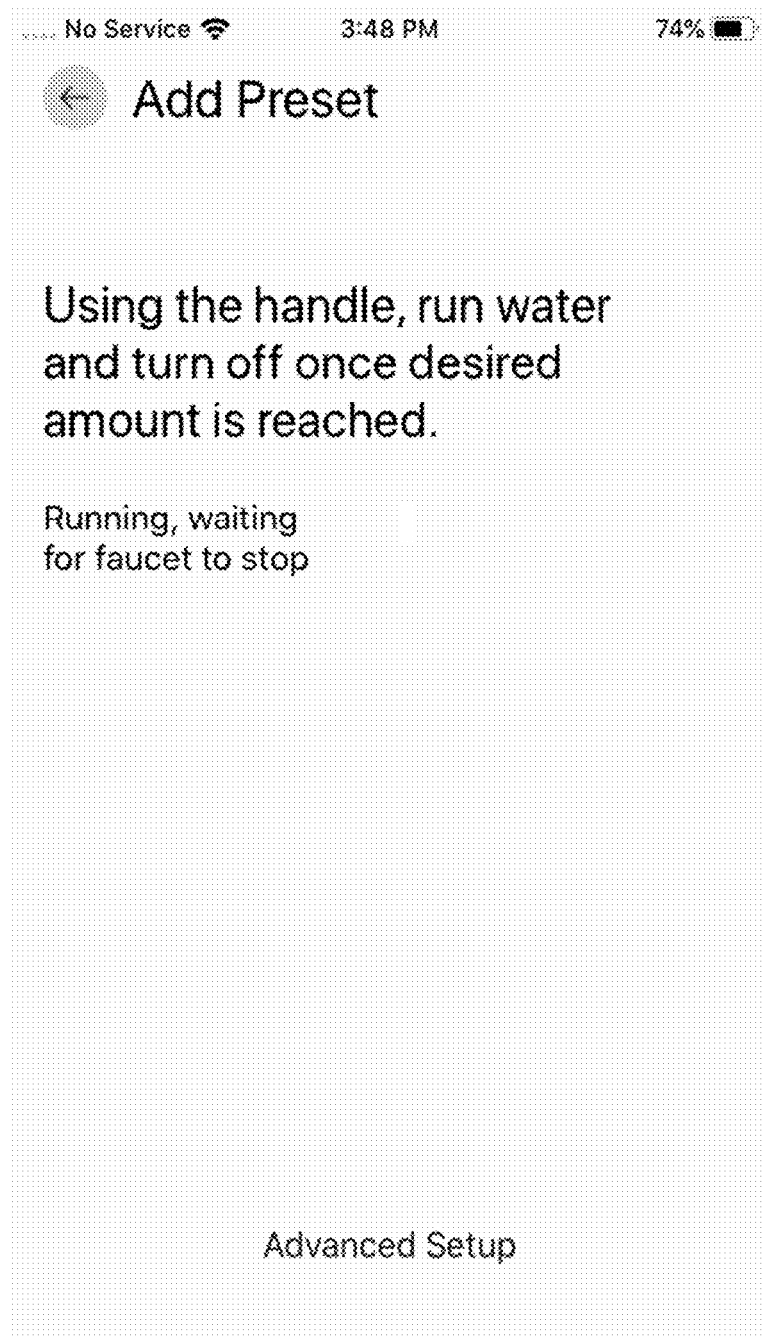

In an exemplary embodiment for creating a preset for the volume by demonstration, the user input module 44 instructs the user to demonstrate the volume using the manual input device 64. For example, the user input module 44 displays a message such as the following: "Do you want a specific amount? Yes or No" (see FIG. 20). If the user selects "Yes," the user input module 44 displays a message such as the following: "Using the handle, run water and turn off once desired amount is reached. Running, waiting for faucet to stop." (see FIG. 21). Once the user activates and deactivates the faucet 12 using the handle 22, the user input module 44 displays a message such as the following: "That was [the detected volume]."

Figure 22:
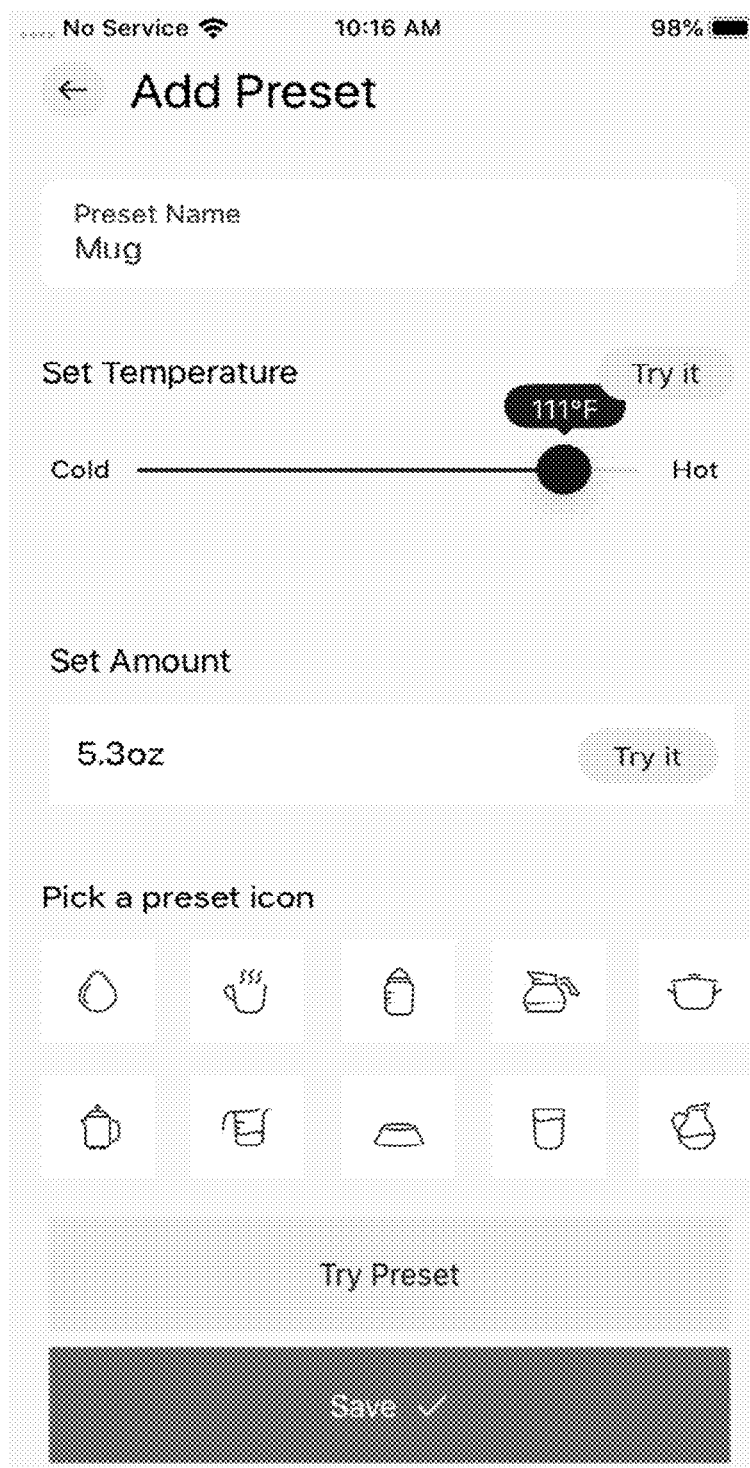
Figure 23:
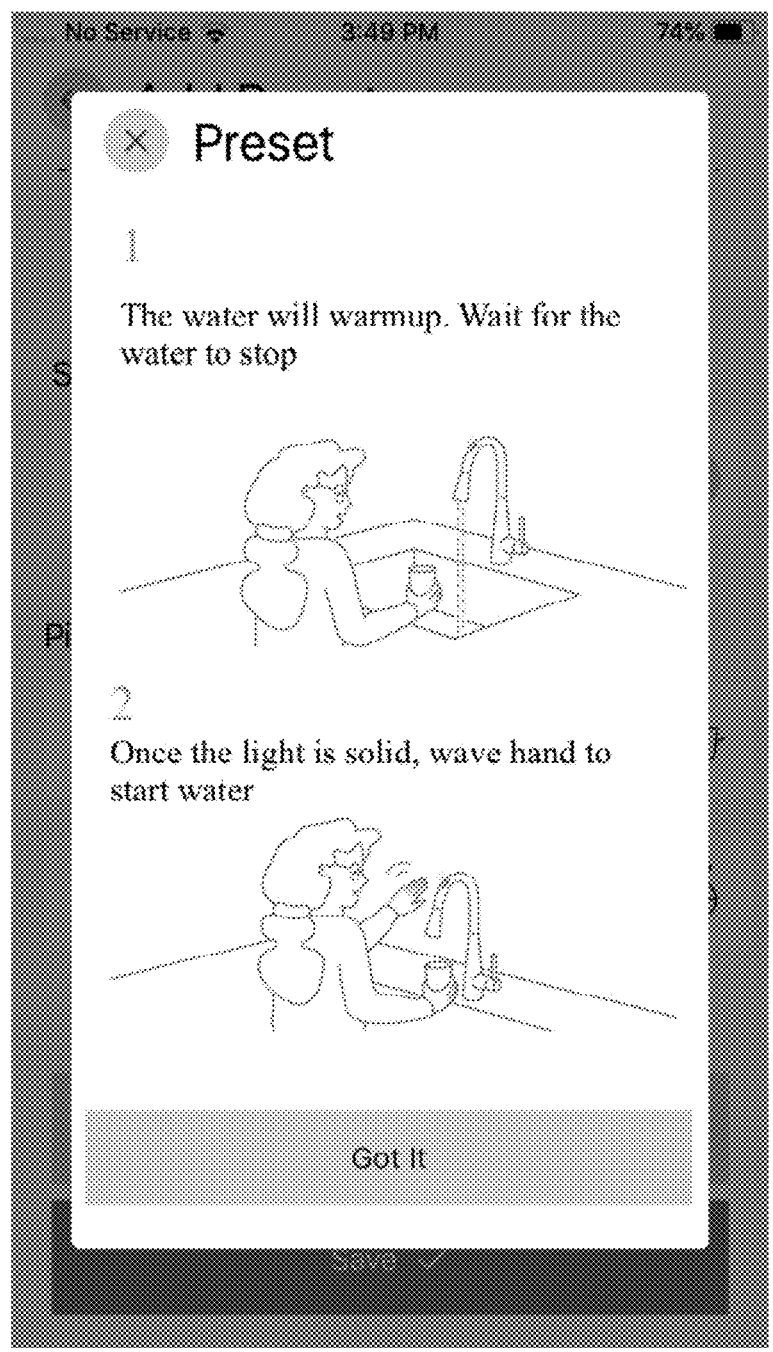

In an exemplary embodiment for creating a preset for the temperature in combination with the volume by demonstration, the user input module 44 instructs the user to demonstrate the temperature using the manual input device 64. For example, the user input module 44 displays a message such as the following: "Do you want to set temperature? Yes or No." (see FIG. 18). If the user selects "Yes," the user input module 44 displays a message such as the following: "Using the handle, run water and turn off once desired temperature is reached. Waiting on faucet." (see FIG. 19). Once the user activates and deactivates the faucet 12 using the handle 22, the user input module 44 displays a message such as the following: "Do you want a specific amount? Yes or No." (see FIG. 20). If the user selects "Yes," the user input module 44 instructs the user to demonstrate the volume using the manual input device 64. For example, the user input module 44 displays a message such as the following: "Using the handle, run water and turn off once desired amount is reached. Running, waiting for faucet to stop." (see FIG. 21). Once the user activates and deactivates the faucet 12 using the handle 22, the user input module 44 displays a message showing the Set Temperature and the Set Amount (see FIG. 22). Additionally, the user input module 44 displays a "Try Preset" button and a "Save" button (see FIG. 22). If the user selects the "Try Preset" button, the user input module 44 displays a message such as the following: "The water will warmup. Wait for the water to stop. Once the light is solid, wave hand to start water." (see FIG. 23). If the user selects the "Save" button, the Set Temperature and the Set Amount are saved as the preset.

Create Manually—Overview

In an exemplary embodiment for creating a preset manually, the user input module 44 displays a series of field(s) and option(s) and the user inputs the desired numerical value(s) of parameter(s) in the field(s). The user input module 44 can also display a field for the user to input a name for the preset.

Create Manually—Embodiment 1

Figure 11:
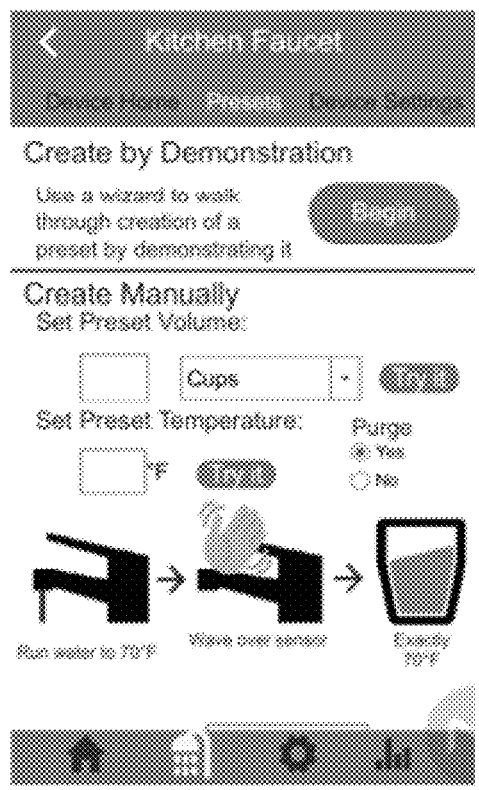
FIGS. 11-17 are illustrations of a mobile device displaying information relating to a preset feature of an electronic plumbing fixture fitting according to an exemplary embodiment of the present invention.

In an exemplary embodiment for creating a preset manually, the user input module 44 displays the parameter(s) and option(s) with corresponding field(s) for the user to input the numerical value(s) and selected the option(s) (see FIG. 11). The user input module 44 can also display a field for the user to input a name for the preset.

In an exemplary embodiment where the user is inputting a numerical value for the temperature, the user input module 44 can display an option for the preset to stop once the water has reached the selected temperature. If the user selects the option to stop, the fitting 10 or the faucet 12 will deliver water until the water reaches the selected temperature. Once the water reaches the selected temperature, the water is stopped and a notification is provided to the user. The notification can be visual (e.g., an illuminated LED) or audible (e.g., a tone or a beep). If the user does not select the option to stop, the fitting 10 or the faucet 12 will deliver water until the water reaches the selected temperature and then the fitting 10 or the faucet 12 continues to deliver water at the selected temperature until the user instructs the fitting 10 or the faucet 12 to stop the water (e.g., by triggering the activation sensor 38 or by closing the handle 22).

In an exemplary embodiment where the user is inputting a numerical value for the volume, the user input module 44 can display an option for the preset to skip sensor activation. If the user selects the option to skip sensor activation, the fitting 10 or the faucet 12 will deliver the selected volume of water upon selection of the preset. If the user does not select the option to skip sensor activation, the fitting 10 or the faucet 12 will deliver the selected volume of water once the user triggers the activation sensor 38.

In an exemplary embodiment where the user is inputting a numerical value for the flow rate, the fitting 10 or the faucet 12 will deliver the selected flow rate of water upon selection of the preset and then the fitting 10 or the faucet 12 continues to deliver water at the selected flow rate until the user instructs the fitting 10 or the faucet 12 to stop the water (e.g., by triggering the activation sensor 38 or by closing the handle 22).

In an exemplary embodiment where the user is inputting numerical values for the temperature and the volume, the user input module 44 can display an option for the preset to wait to warmup. If the user selects the option to wait to warmup, the fitting 10 or the faucet 12 will deliver water until the water reaches the selected temperature. Once the water reaches the selected temperature, the water is stopped and a notification is provided to the user. The notification can be visual (e.g., an illuminated LED) or audible (e.g., a tone or a beep). If the user does not select the option to wait to warmup, the fitting 10 or the faucet 12 will deliver the water immediately, but bring the temperature of the water to the selected temperature as quickly as possible.

Additionally, in an exemplary embodiment where the user is inputting numerical values for the temperature and the volume, the user input module 44 can display an option for the preset to skip sensor activation. If the user selects the option to skip sensor activation, the fitting 10 or the faucet 12 will deliver the selected volume of water upon selection of the preset. If the user does not select the option to skip sensor activation, the fitting 10 or the faucet 12 will deliver the selected volume of water once the user triggers the activation sensor 38.

Create Manually—Embodiment 2

In another exemplary embodiment for creating a preset manually, the user input module 44 displays the parameter(s) and option(s) with corresponding field(s) for the user to input the numerical value(s) and select the option(s) (see FIGS. 24-28). As shown in FIGS. 24-28, an option is selected if the dot next to the option is to the right in the corresponding input field and is not selected if the dot next to the option is to the left in the corresponding input field. The user input module 44 can also display a field for the user to input a name for the preset.

Figure 24:
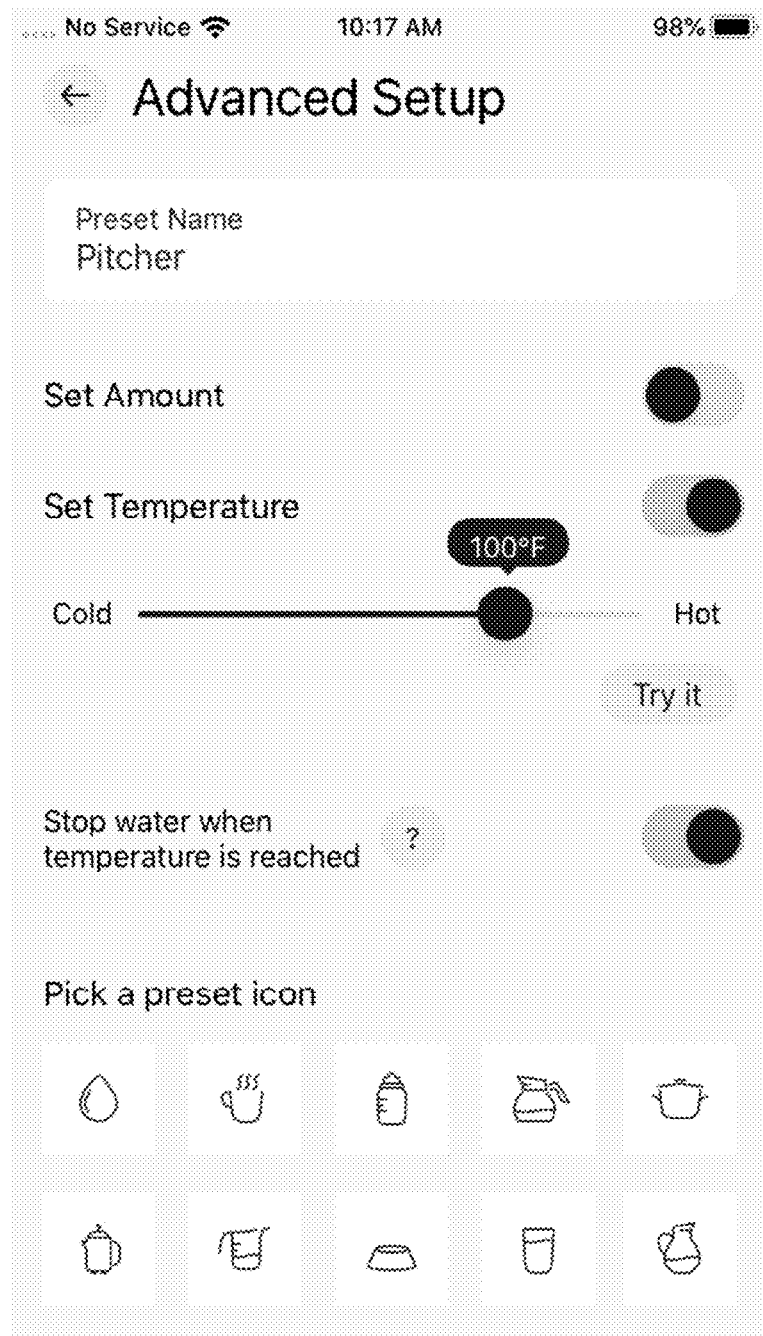

In another exemplary embodiment where the user is inputting a numerical value for the temperature, the user input module 44 can display an option for the preset to "Stop water when temperature is reached" (see FIG. 24). If the user selects the option to stop (see FIG. 24), the fitting 10 or the faucet 12 will deliver water until the water reaches the selected temperature. Once the water reaches the selected temperature, the water is stopped and a notification is provided to the user. The notification can be visual (e.g., an illuminated LED) or audible (e.g., a tone or a beep). If the user does not select the option to stop (see FIG. 25), the fitting 10 or the faucet 12 will deliver water until the water reaches the selected temperature and then the fitting 10 or the faucet 12 continues to deliver water at the selected temperature until the user instructs the fitting 10 or the faucet 12 to stop the water (e.g., by triggering the activation sensor 38 or by closing the handle 22). Additionally, the user input module 44 display can display an option for the user to input a flow rate for the water (see FIG. 25).

Figure 25:
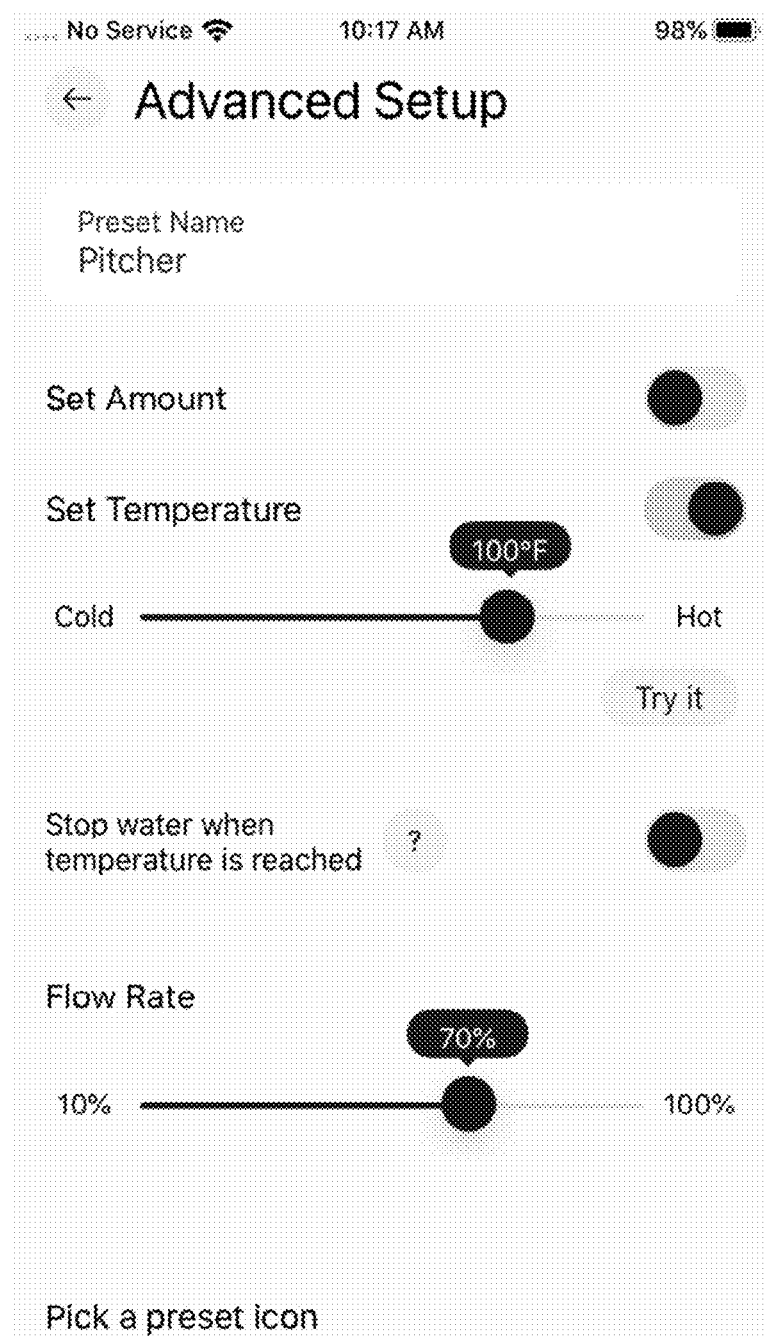

In another exemplary embodiment where the user is inputting a numerical value for the flow rate, the fitting 10 or the faucet 12 will deliver the selected flow rate of water upon selection of the preset and then the fitting 10 or the faucet 12 continues to deliver water at the selected flow rate until the user instructs the fitting 10 or the faucet 12 to stop the water (e.g., by triggering the activation sensor 38 or by closing the handle 22) (see FIG. 25).

Figure 26:
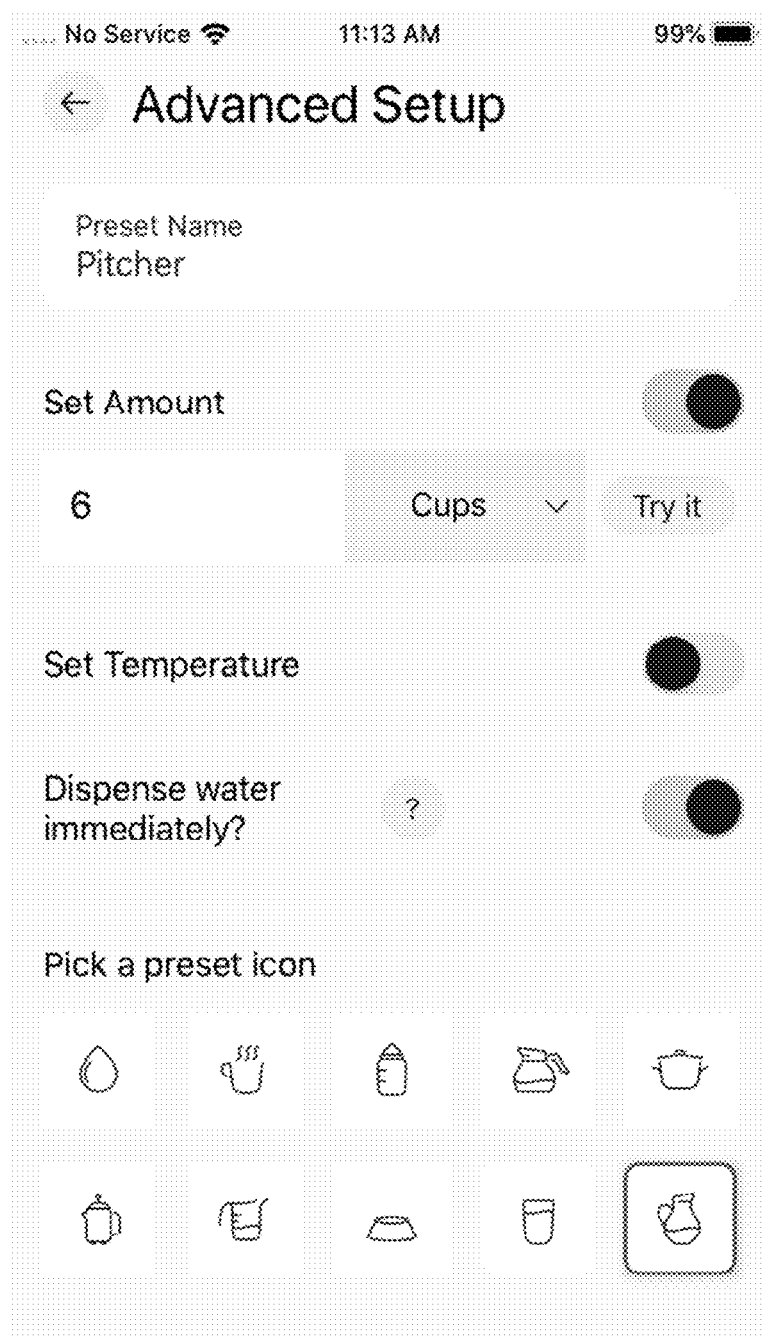

In another exemplary embodiment where the user is inputting a numerical value for the volume, the user input module 44 can display an option for the preset to "Dispense water immediately?" (see FIG. 26). If the user selects the option to dispense water immediately (see FIG. 26), the fitting 10 or the faucet 12 will deliver the selected volume of water upon selection of the preset. If the user does not select the option to dispense water immediately, the fitting 10 or the faucet 12 will deliver the selected volume of water once the user triggers the activation sensor 38.

Figure 27:
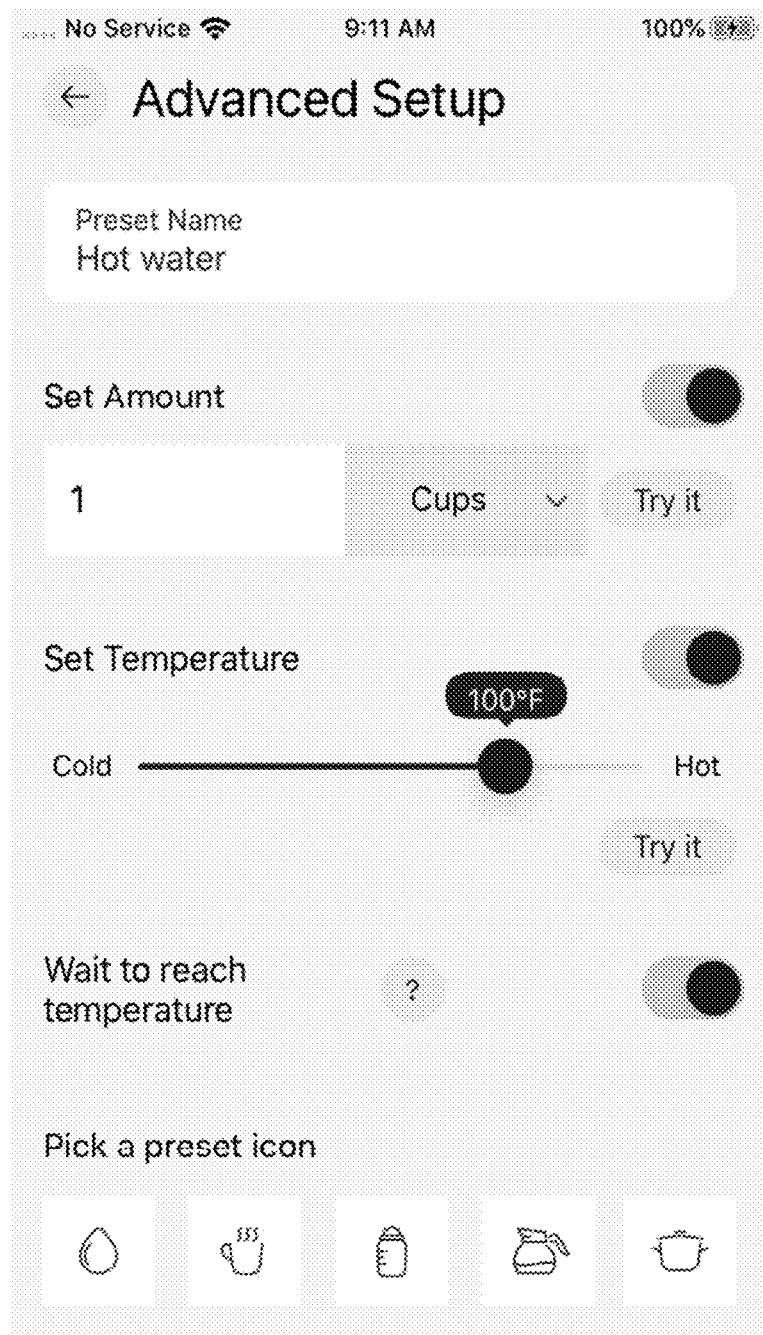

In another exemplary embodiment where the user is inputting numerical values for the temperature and the volume, the user input module 44 can display an option for the preset to "Wait to reach temperature" (see FIG. 27). If the user selects the option to wait to reach temperature (see FIG. 27), the fitting 10 or the faucet 12 will deliver water until the water reaches the selected temperature. Once the water reaches the selected temperature, the water is stopped and a notification is provided to the user. The notification can be visual (e.g., an illuminated LED) or audible (e.g., a tone or a beep). If the user does not select the option to wait to reach temperature, the fitting 10 or the faucet 12 will deliver the water immediately, but bring the temperature of the water to the selected temperature as quickly as possible.

Figure 28:
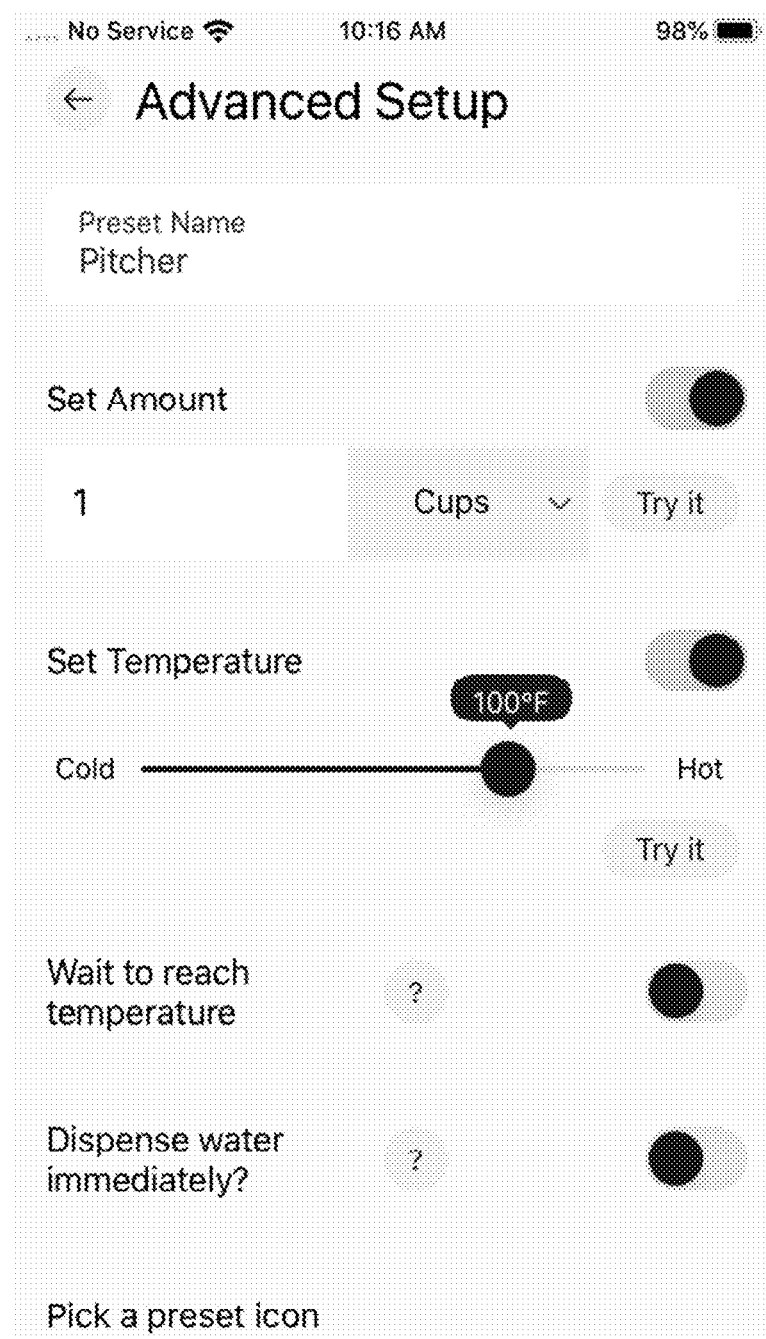

Additionally, in another exemplary embodiment where the user is inputting numerical values for the temperature and the volume, the user input module 44 can display an option for the preset to "Dispense water immediately" (see FIG. 28). If the user selects the option to dispense water immediately, the fitting 10 or the faucet 12 will deliver the selected volume of water upon selection of the preset. If the user does not select the option to dispense water immediately (see FIG. 28), the fitting 10 or the faucet 12 will deliver the selected volume of water once the user triggers the activation sensor 38.

Figure 29:
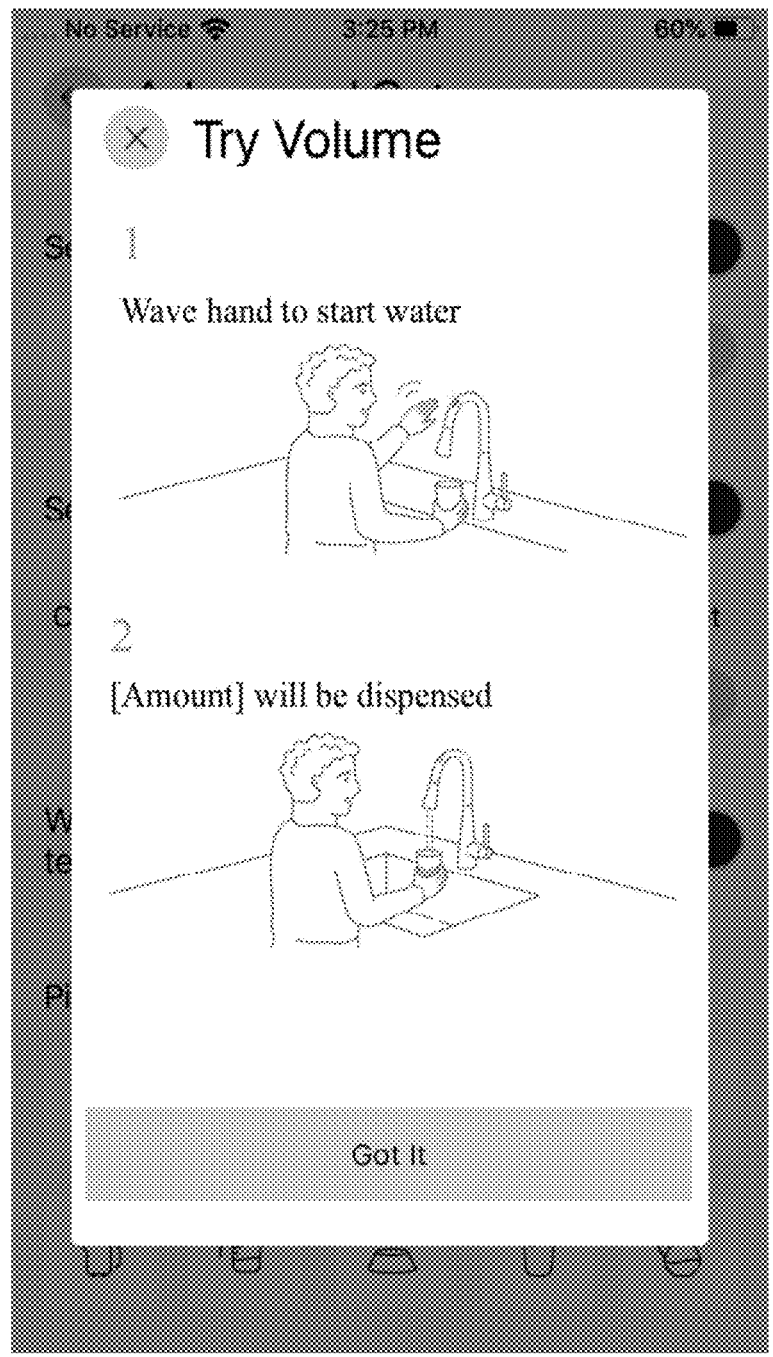

In another exemplary embodiment where the user is inputting a numerical value for the volume (either with or without the temperature), the user input module 44 displays a "Try it" button near the volume. If the user presses the "Try it" button for the volume, the user input module 44 displays a message such as the following: "Wave hand to start water" and "[the desired volume] will be dispensed" (see FIG. 29).

Create from Usage/Recent History or Session Information

Figure 30:
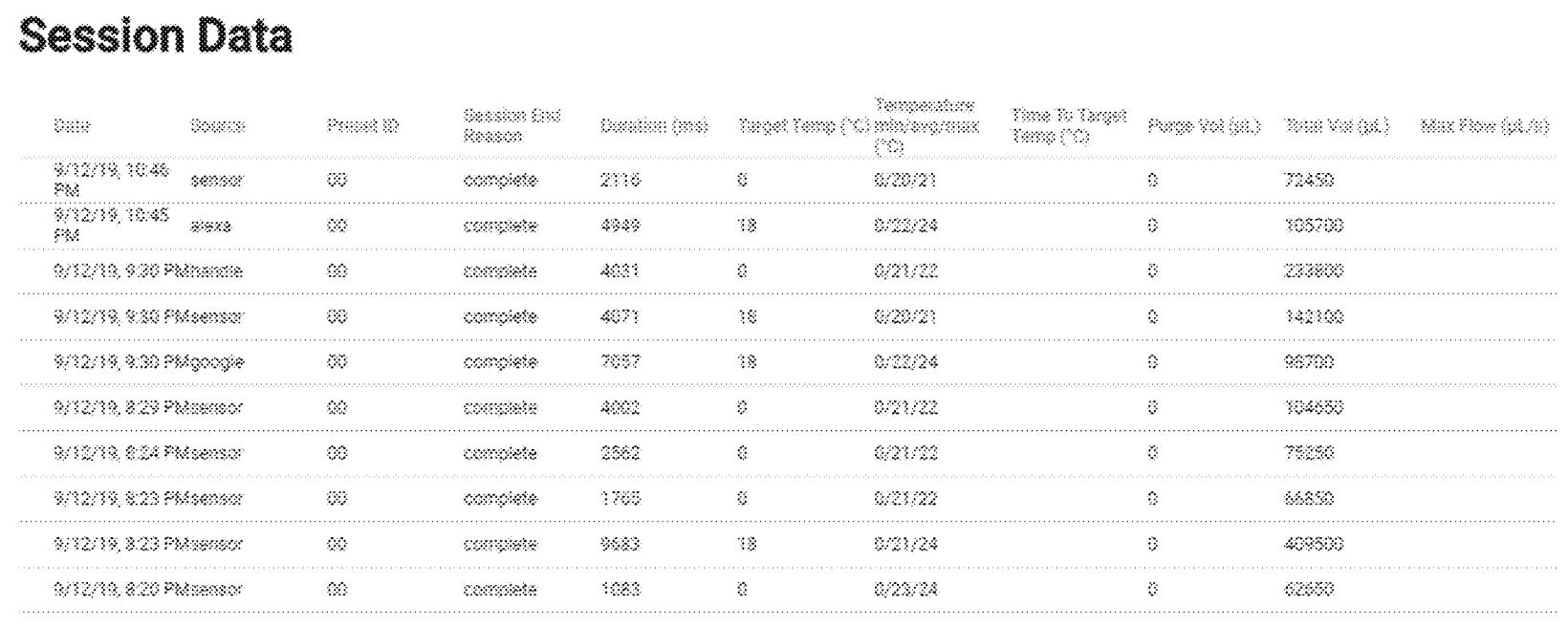

In an exemplary embodiment, the fitting 10 or the faucet 12 includes sessions. A session is a period of activation of the fitting 10 or the faucet 12 by the user. Information is associated with each session. Exemplary session information includes an activation date, an activation time, a deactivation time, a duration of activation, a source of activation, a preset name or number, a target temperature, a minimum temperature, a maximum temperature, an average temperature, a time to target temperature, a target volume, a purged volume, a total volume, a target flow rate, a minimum flow rate, a maximum flow rate, and an average flow rate. The session information is saved. The session information can be saved in a log of sessions (see FIG. 30). The session information can be saved in the memory 52.

In an exemplary embodiment for creating a preset from usage/recent history or session information, the user input module 44 displays the usage/recent history or the session information to the user. The user input module 44 can display a series of usage/recent history or the session log to the user. The user can select the usage/recent history or the session information that should be used to create the preset. The preset will then be created from the selected usage/recent history or the session information.

Figure 31:
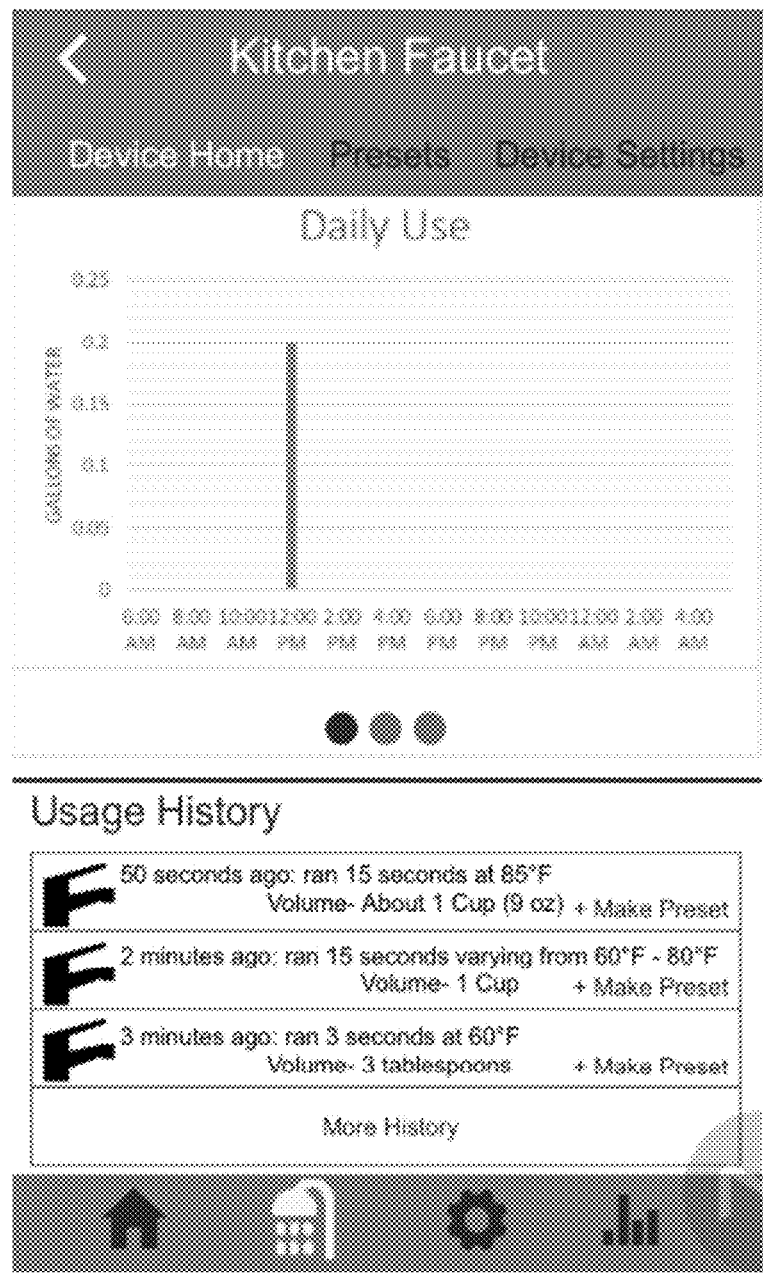
FIG. 31 is an illustration of a mobile device displaying information relating to a preset feature of an electronic plumbing fixture fitting according to an exemplary embodiment of the present invention.

In an exemplary embodiment, the user input module 44 displays the following to the user: "Usage History: 50 seconds ago—ran 15 seconds at 85° F., Volume—About 1 Cup (9 oz); 2 minutes ago—ran 15 seconds varying from 60° F.-80° F., Volume—1 Cup; 3 minutes ago—ran 3 second at 60° F., Volume—3 tablespoons" (see FIG. 31). The user selects one of the displayed usages and the selected information is saved as a preset.

Figure 32:
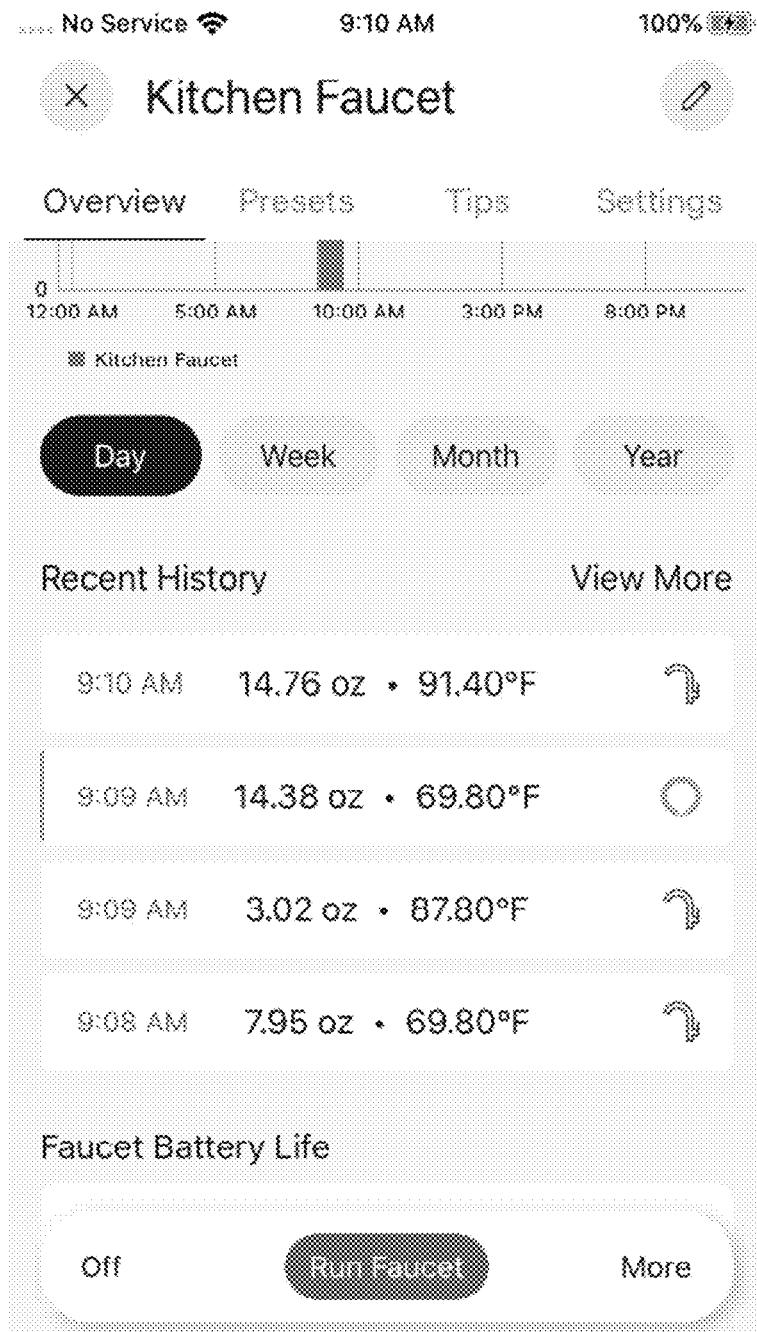
FIGS. 32 and 33 are illustrations of a mobile device displaying information relating to a preset feature of an electronic plumbing fixture fitting according to another exemplary embodiment of the present invention.

In another exemplary embodiment, the user input module 44 displays the following to the user: "Recent History: 9:10 AM-14.76 oz-91.40° F.; 9:09 AM-14.38 oz-69.80° F.; 9:09 AM-3.02 oz-87.80° F.; 9:08 AM-7.95 oz-69.80° F." (see FIG. 32). The user selects one of the displayed usages and the selected information is saved as a preset.

The user input module 44 could also suggest a preset to the user based on the session information. For example, if the faucet 12 observed the following sequence of operation: turn on water, water runs and warms up, water temperature stabilizes at 100 degrees, water temperature increased in response to handle manipulation, water temperature stabilizes at 110 degrees, object inserted in sink, 22 ounces of water run while object detected, object removed from sink, and water turned off," the user input module 44 could suggest the following preset to the user: "Dispense 22 ounces of 110 degree water with purge cycle enabled." If the user selects the suggested preset, the session information is saved as a preset. Similarly, if the fitting 10 (such as a showering system) observed the following sequence of operation: turn on water, water runs and warms up, water temperature stabilizes at 100 degrees, water runs for 5 minutes, water temperature increased in response to handle manipulation, water temperature stabilizes at 110 degrees, water runs for 10 minutes, and water turned off," the user input module 44 could suggest the following preset to the user: "Run water for 5 minutes at 100 degrees, then run water for 10 minutes at 110 degrees, with purge cycle enabled." If the user selects the suggested preset, the session information is saved as a preset.

Create for Hottest or Coldest Possible

If the user wants to create a preset for the temperature at full hot water or full cold water, the temperature of the water actually dispensed from the fitting 10 or the faucet 12 will vary depending on current environmental conditions (e.g., the coldest water from the water supply in the summer is warmer than the coldest water from the water supply in the winter). In an exemplary embodiment, the invention includes a mechanism (e.g., the parameter or position sensor 38) to detect a position or movement of the handle 22 when the user is demonstrating the temperature.

Figure 33:
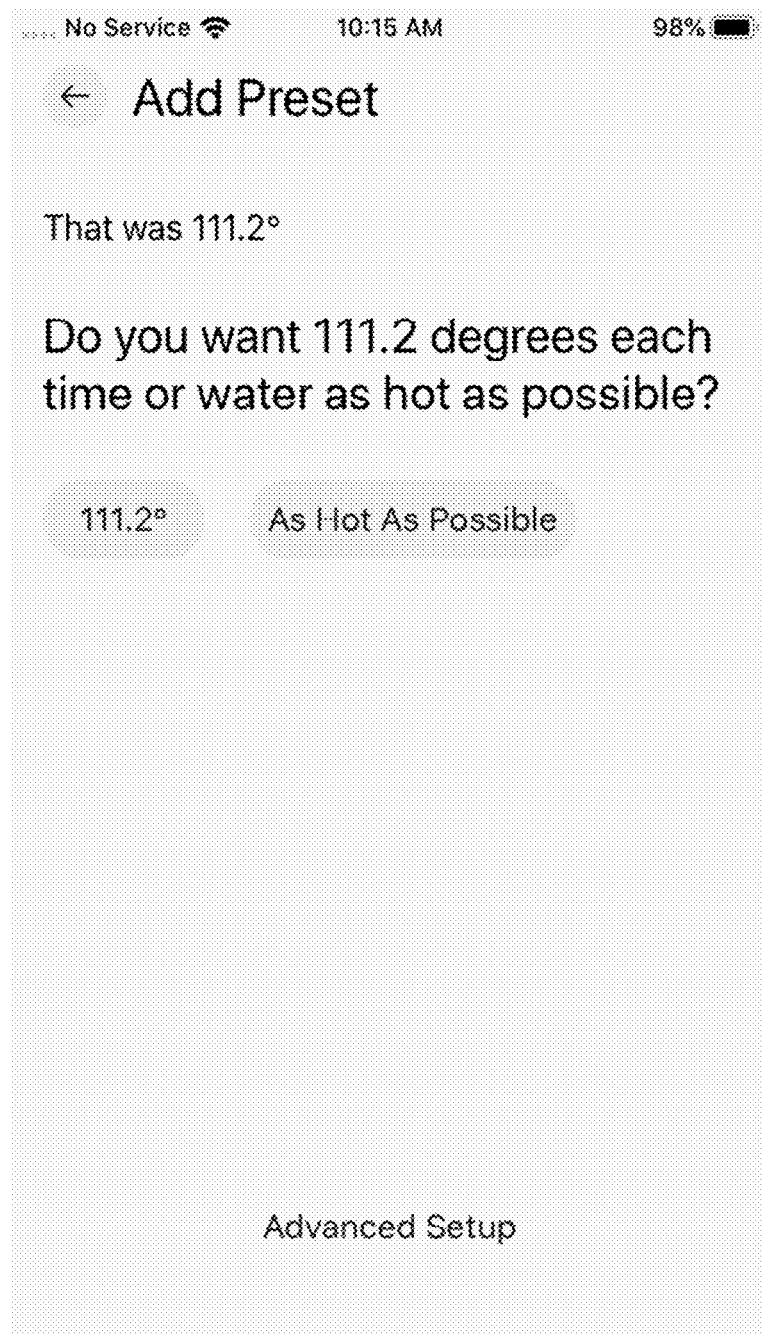

If the user is creating a preset for temperature and the handle 22 is in the full hot or full cold position, the user input module 44 asks the user if they want the temperature that was demonstrated or the temperature as hot (if the handle 22 is in the full hot position) or as cold (if the handle 22 is in the full cold position) as possible (see FIG. 33). If the user specifies that they want the temperature that was demonstrated, that temperature is saved as the preset and the fitting 10 or the faucet 12 will attempt to dispense water at that temperature when the preset is selected. If the user specifies that they want the temperature as hot or as cold as possible, the temperature extreme (hot or cold) is saved as the preset and the fitting 10 or the faucet 12 will dispense water as hot or as cold as possible given the current environmental conditions when the preset is selected.

Run Preset

Figure 34:
FIG. 34 is an illustration of a mobile device displaying information relating to a preset feature of an electronic plumbing fixture fitting according to an exemplary embodiment of the present invention.

In an exemplary embodiment, once a preset is saved, the user input module 44 displays the name of the preset and a "Run" button near the preset (see FIG. 34). If the user presses the "Run" button, the user input module 44, the processor 50, the electronic valve 32, and the sensors communicate as described above so that water will be delivered through the discharge outlet 24 of the fitting 10 or the faucet 12 with the numerical value(s) of parameter(s) associated with the selected preset.

Figure 35:
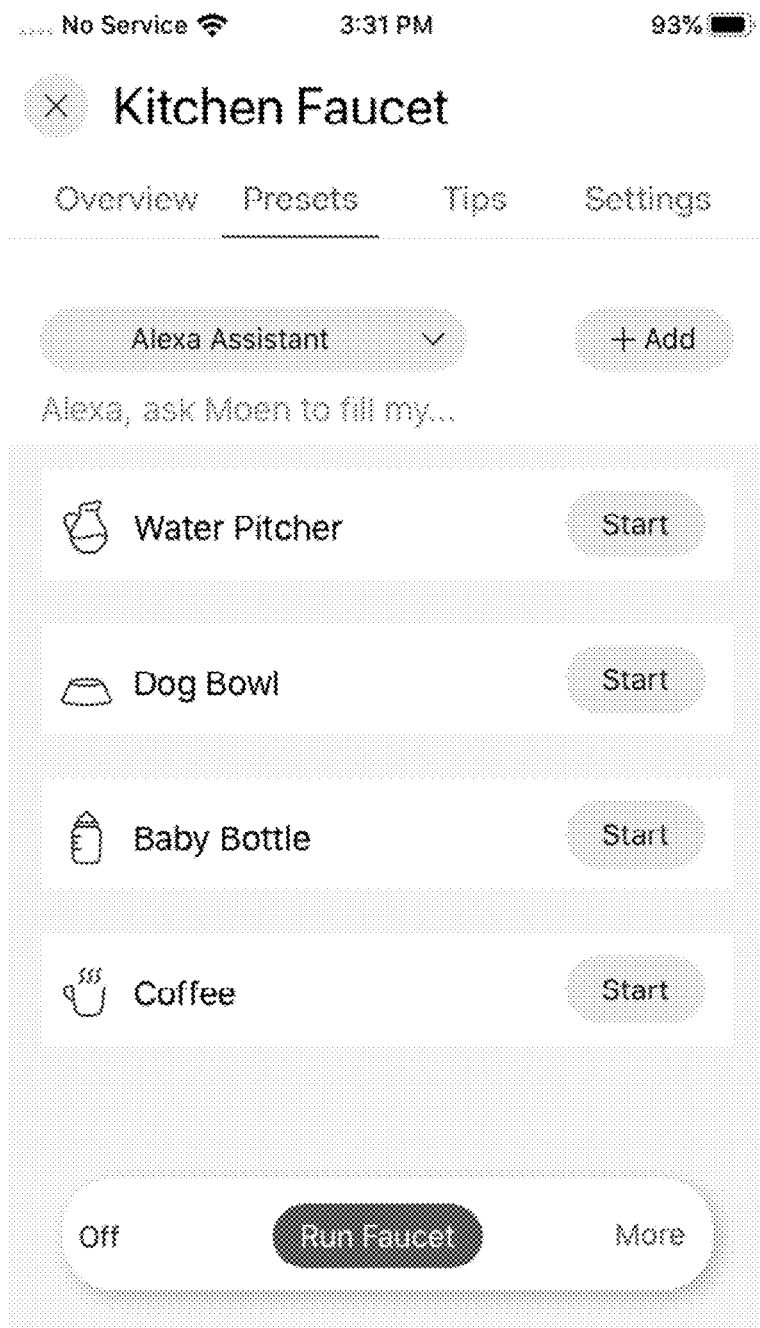
FIG. 35 is an illustration of a mobile device displaying information relating to a preset feature of an electronic plumbing fixture fitting according to another exemplary embodiment of the present invention.

In another exemplary embodiment, once a preset is saved, the user input module 44 displays the name of the preset and a "Start" button near the preset (see FIG. 35). If the user presses the "Start" button, the user input module 44, the processor 50, the electronic valve 32, and the sensors communicate as described above so that water will be delivered through the discharge outlet 24 of the fitting 10 or the faucet 12 with the numerical value(s) of parameter(s) associated with the selected preset.

In the above description of the demonstration feature, the user input module 44, the processor 50, the electronic valve 32, and the sensors are described as sending and receiving appropriate signals to accomplish the demonstration steps. Similarly, although not described in as much detail in the above description of the preset feature, the user input module 44, the processor 50, the electronic valve 32, and the sensors send and receive appropriate signals to accomplish the preset steps.

In the above description of the demonstration and preset features, the user input module 44 is described and shown as including the mobile device 66 that receives input from the user and displays messages to the user. Similarly, the user input module 44 is described and shown as including the handle 22 that is moved by the user. However, one of ordinary skill in the art will appreciate that the user input module 44 could include other components, either alone or in combination, that communicate with the user (e.g., receive input from and communicate messages to the user). For example, the voice controlled device 68 could receive voice commands from the user and issue voice instructions to the user. Likewise, a touch screen device or a push button device could communicate with the user, and a joystick could be moved by the user.

In the above description of the demonstration and preset features, the faucet 12 is described as being turned off by moving the handle 22 to a closed position to indicate a desired or demonstrated parameter of water (e.g., temperature, flow rate, and/or volume). One of ordinary skill in the art will appreciate that the handle 22 or other manual input device 64 could be moved to any predetermined final position in order to indicate the desired or demonstrated temperature. For example, the handle 22 could be moved to the full hot or full cold position to indicate a desired or demonstrated parameter of water. Additionally, the predetermined final position could be customizable by the user.

One of ordinary skill in the art will now appreciate that the present invention provides an electronic plumbing fixture fitting, such as an electronic faucet, including a preset feature. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. An electronic plumbing fixture fitting, comprising:
    a discharge outlet, the discharge outlet operable to deliver water;
    an electronic valve, the electronic valve operable to permit flow of water through the discharge outlet when the electronic valve is activated and to not permit flow of water through the discharge outlet when the electronic valve is deactivated, the electronic valve operable to control a parameter of water flowing through the discharge outlet;
    a user input module, the user input module operable to communicate with a user regarding a desired value of the parameter of water, the user input module including:
        an electronic input device, the electronic input device operable to receive an instruction from the user regarding the desired value of the parameter of water;
        a manual input device, the manual input device operable to be moved by the user to demonstrate the desired value of the parameter of water;
        a position sensor, the position sensor operable to detect movement of the manual input device to a position demonstrating the desired value of the parameter of water and to a predetermined final position;

a water sensor, the water sensor operable to detect a value of the parameter of water;

a processor, the processor operable to communicate with each of the electronic valve, the electronic input device, the water sensor, and the position sensor regarding at least one of the desired value of the parameter of water and the detected value of the parameter of water;

wherein the electronic input device is operable to receive an instruction from the user to create a preset for the desired value of the parameter of water and to instruct the user to demonstrate the desired value using the manual input device;

wherein the position sensor is operable to detect movement of the manual input device by the user to the position demonstrating the desired value of the parameter of water and to the predetermined final position and to send signals to the processor indicating the position demonstrating the desired value of the parameter of water and the predetermined final position;

wherein the processor is operable to receive the signals from the position sensor indicating the position demonstrating the desired value of the parameter of water and the predetermined final position and to send a signal to the electronic valve to control the parameter of water;

wherein the electronic valve is operable to receive the signal from the processor to control the parameter of water and to adjust the parameter of water;

wherein the water sensor is operable to detect the value of the parameter of water and to send a signal to the processor indicating the detected value of the parameter;

wherein, until the manual input device is moved to the predetermined final position, the processor is operable to receive the signal from the position sensor indicating the position demonstrating the desired value of the parameter of water and to send a signal to the electronic valve to further control the parameter of water;

wherein, until the manual input device is moved to the predetermined final position, the electronic valve is operable to receive the signal from the processor to control the electronic valve and to adjust the parameter of water;

wherein, until the manual input device is moved to the predetermined final position, the water sensor is operable to detect the value of the parameter of water and to send the signal to the processor indicating the detected value of the parameter; and wherein, once the manual input device is moved to the predetermined final position, the detected value of the parameter is saved as the preset.

2. The electronic plumbing fixture fitting of claim 1, wherein the parameter of water is at least one of temperature, flow rate and volume.

3. The electronic plumbing fixture fitting of claim 1, wherein the electronic input device includes at least one of a mobile device, a voice controlled device, and an activation sensor.

4. The electronic plumbing fixture fitting of claim 1, wherein the electronic input device includes a mobile device, a voice controlled device, and an activation sensor.

5. The electronic plumbing fixture fitting of claim 1, wherein the manual input device is a handle.

6. The electronic plumbing fixture fitting of claim 1, wherein the predetermined final position is a closed position.

7. The electronic plumbing fixture fitting of claim 1, wherein the preset is saved in memory in at least one of a control module, a server, and a cloud.

8. An electronic plumbing fixture fitting, comprising:

a discharge outlet, the discharge outlet operable to deliver water;

an electronic valve, the electronic valve operable to permit flow of water through the discharge outlet when the electronic valve is activated and to not permit flow of water through the discharge outlet when the electronic valve is deactivated, the electronic valve operable to control a parameter of water flowing through the discharge outlet;

a user input module, the user input module operable to communicate with a user regarding a desired value of the parameter of water, the user input module including:

an electronic input device, the electronic input device operable to receive an instruction from the user regarding the desired value of the parameter of water;

a manual input device, the manual input device operable to be moved by the user to demonstrate the desired value of the parameter of water;

a position sensor, the position sensor operable to detect movement of the manual input device to a position demonstrating the desired value of the parameter of water and to a predetermined final position;

a water sensor, the water sensor operable to detect a value of the parameter of water;

a processor, the processor operable to communicate with each of the electronic valve, the electronic input device, the water sensor, and the position sensor regarding at least one of the desired value of the parameter of water and the detected value of the parameter of water;

wherein the electronic input device is operable to receive an instruction from the user to create a preset for the desired value of the parameter of water and to instruct the user to demonstrate the desired value using the manual input device;

wherein the position sensor is operable to detect movement of the manual input device by the user to the position demonstrating the desired value of the parameter of water and to the predetermined final position and to send a signal to the processor indicating the position demonstrating the desired value of the parameter of water;

wherein the processor is operable to receive the signal from the position sensor indicating the position demonstrating the desired value of the parameter of water and to send a signal to the electronic valve to control the parameter of water;

wherein the electronic valve is operable to receive the signal from the processor to control the parameter of water and to adjust the parameter of water;

wherein the water sensor is operable to detect the value of the parameter of water and to send a signal to the processor indicating the detected value of the parameter;

wherein, until the manual input device is moved to the predetermined final position, the processor is operable to receive the signal from the position sensor indicating the position demonstrating the desired value of the parameter of water and to send a signal to the electronic valve to further control the parameter of water;

wherein, until the manual input device is moved to the predetermined final position, the electronic valve is operable to receive the signal from the processor to control the electronic valve and to adjust the parameter of water;

wherein, until the manual input device is moved to the predetermined final position, the water sensor is operable to detect the value of the parameter of water and to send the signal to the processor indicating the detected value of the parameter;

wherein, once the manual input device is moved to the predetermined final position, if the manual input device was in a full hot position, the electronic input device communicates with the user asking if the user wants the detected value of the parameter or the hottest temperature water that is available when the user selects the preset, if the user wants the detected value of the parameter, the detected value of the parameter is saved as the preset, and if the user wants the hottest temperature water that is available, that information is saved as the preset; and wherein, once the manual input device is moved to the predetermined final position, if the manual input device was in a full cold position, the electronic input device communicates with the user asking if the user wants the detected value of the parameter or the coldest temperature water that is available when the user selects the preset, if the user wants the detected value of the parameter, the detected value of the parameter is saved as the preset, and if the user wants the coldest temperature water that is available, that information is saved as the preset.

9. The electronic plumbing fixture fitting of claim 8, wherein the parameter of water is at least one of temperature, flow rate and volume.

10. The electronic plumbing fixture fitting of claim 8, wherein the electronic input device includes at least one of a mobile device, a voice controlled device, and an activation sensor.

11. The electronic plumbing fixture fitting of claim 8, wherein the electronic input device includes a mobile device, a voice controlled device, and an activation sensor.

12. The electronic plumbing fixture fitting of claim 8, wherein the manual input device is a handle.

13. The electronic plumbing fixture fitting of claim 8, wherein the predetermined final position is a closed position.

14. The electronic plumbing fixture fitting of claim 8, wherein the preset is saved in memory in at least one of a control module, a server, and a cloud.

15. An electronic plumbing fixture fitting, comprising:
a discharge outlet, the discharge outlet operable to deliver water;
an electronic valve, the electronic valve operable to permit flow of water through the discharge outlet when the electronic valve is activated and to not permit flow of water through the discharge outlet when the electronic valve is deactivated, the electronic valve operable to control a parameter of water flowing through the discharge outlet;
a user input module, the user input module operable to communicate with a user regarding a desired value of the parameter of water, the user input module including:
an electronic input device, the electronic input device operable to receive an instruction from the user regarding the desired value of the parameter of water;
a manual input device, the manual input device operable to be moved by the user to demonstrate the desired value of the parameter of water;
a position sensor, the position sensor operable to detect movement of the manual input device to a position demonstrating the desired value of the parameter of water and to a predetermined final position;
a water sensor, the water sensor operable to detect a value of the parameter of water;
a processor, the processor operable to communicate with each of the electronic valve, the electronic input device, the water sensor, and the position sensor regarding at least one of the desired value of the parameter of water and the detected value of the parameter of water;
wherein the electronic input device is operable to receive an instruction from the user to create a preset for the desired value of the parameter of water and to instruct the user to demonstrate the desired value using the manual input device;
wherein the position sensor is operable to detect movement of the manual input device by the user to the position demonstrating the desired value of the parameter of water and to the predetermined final position and to send a signal to the processor indicating the position demonstrating the desired value of the parameter of water;
wherein the processor is operable to receive the signal from the position sensor indicating the position demonstrating the desired value of the parameter of water and to send a signal to the electronic valve to control the parameter of water;
wherein the electronic valve is operable to receive the signal from the processor to control the parameter of water and to adjust the parameter of water;
wherein the water sensor is operable to detect the value of the parameter of water and to send a signal to the processor indicating the detected value of the parameter;
wherein, until the manual input device is moved to the predetermined final position, the processor is operable to receive the signal from the position sensor indicating the position demonstrating the desired value of the parameter of water and to send a signal to the electronic valve to further control the parameter of water;
wherein, until the manual input device is moved to the predetermined final position, the electronic valve is operable to receive the signal from the processor to control the electronic valve and to adjust the parameter of water;
wherein, until the manual input device is moved to the predetermined final position, the water sensor is operable to detect the value of the parameter of water and to send the signal to the processor indicating the detected value of the parameter;
wherein, once the manual input device is moved to the predetermined final position, information regarding the detected value of the parameter is saved as a session;
wherein, after the manual input device is moved to the predetermined final position, the electronic input device communicates with the user asking if they want to save the session as a preset; and
wherein, if the user wants to save the session as a preset, the session information is saved as the preset.

16. The electronic plumbing fixture fitting of claim 15, wherein the parameter of water is at least one of temperature, flow rate and volume.

17. The electronic plumbing fixture fitting of claim 15, wherein the electronic input device includes at least one of a mobile device, a voice controlled device, and an activation sensor.

18. The electronic plumbing fixture fitting of claim 15, wherein the electronic input device includes a mobile device, a voice controlled device, and an activation sensor.

19. The electronic plumbing fixture fitting of claim 15, wherein the manual input device is a handle.

20. The electronic plumbing fixture fitting of claim 15, wherein the predetermined final position is a closed position.

21. The electronic plumbing fixture fitting of claim 15, wherein the preset is saved in memory in at least one of a control module, a server, and a cloud.

* * * * *